(12) United States Patent
Lane et al.

(10) Patent No.: US 10,606,926 B2
(45) Date of Patent: *Mar. 31, 2020

(54) UNIFIED MESSAGING PLATFORM AND INTERFACE FOR PROVIDING INLINE REPLIES

(71) Applicant: Microsoft Technology Licensing, LLC, Redmond, WA (US)

(72) Inventors: Mira Lane, Bellevue, WA (US); Michael Brasket, Kirkland, WA (US); Larry Waldman, Seattle, WA (US); Chad Voss, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,079

(22) Filed: Jan. 18, 2019

(65) Prior Publication Data

US 2019/0155871 A1    May 23, 2019

Related U.S. Application Data

(63) Continuation of application No. 14/801,209, filed on Jul. 16, 2015, now Pat. No. 10,216,709.
(Continued)

(51) Int. Cl.
*G06F 17/00*    (2019.01)
*G06F 17/21*    (2006.01)
(Continued)

(52) U.S. Cl.
CPC ......... *G06F 17/212* (2013.01); *G06Q 10/101* (2013.01); *G06Q 10/103* (2013.01);
(Continued)

(58) Field of Classification Search
CPC .. G06F 17/212; G06Q 10/101; G06Q 10/103; H04L 51/02; H04L 51/063; H04L 51/14; H04L 51/16; H04L 51/24; H04L 51/36
(Continued)

(56) References Cited

U.S. PATENT DOCUMENTS 8,225,219 B2 *   7/2012   Edelen ................. G06Q 10/107
                                                                   709/206
9,043,411 B2 *   5/2015   Claux ................... G06F 17/211
                                                                   709/206
(Continued)

OTHER PUBLICATIONS

Kwan et al., The Hidden Experts in Software-Engineering Communication (NIER Track), ACM 2011, pp. 800-803. (Year: 2011).*
(Continued)

*Primary Examiner* — Cong-Lac Huynh
(74) *Attorney, Agent, or Firm* — Schwegman Lundberg & Woessner, P.A.

(57) ABSTRACT

Methods, systems, and computer readable storage medium for messaging user interfaces are disclosed. In one aspect, a system includes hardware processing circuitry configured to scan a message to identify a structure of first text content included in the message, the structure identifying at least one element of the first text content, the one element having a location within the first text content, receive an indication selecting the one element, display a new text input field within the first text content at the location of the selected one element, receive reply text content into the new input field, and send a reply to the message, wherein the reply comprises the reply text content integrated into the message at the location.

20 Claims, 22 Drawing Sheets

Related U.S. Application Data

(60) Provisional application No. 62/165,856, filed on May 22, 2015, provisional application No. 62/165,880, filed on May 22, 2015.

(51) Int. Cl.
  *H04L 12/58* (2006.01)
  *G06Q 10/10* (2012.01)
  *H04W 4/14* (2009.01)
  *H04W 4/18* (2009.01)

(52) U.S. Cl.
  CPC ............ *H04L 51/02* (2013.01); *H04L 51/063* (2013.01); *H04L 51/14* (2013.01); *H04L 51/16* (2013.01); *H04L 51/24* (2013.01); *H04L 51/36* (2013.01); *H04W 4/14* (2013.01); *H04W 4/18* (2013.01)

(58) Field of Classification Search
  USPC .......................................................... 715/243
  See application file for complete search history.

(56) References Cited

U.S. PATENT DOCUMENTS

| | | | | |
|---|---|---|---|---|
| 9,485,542 | B2* | 11/2016 | Girish | H04L 51/10 |
| 10,216,709 | B2 | 2/2019 | Lane et al. | |
| 2007/0282956 | A1* | 12/2007 | Staats | G06Q 10/107 709/206 |
| 2008/0037726 | A1* | 2/2008 | Yao | H04L 51/36 379/88.13 |
| 2011/0010665 | A1* | 1/2011 | DeLuca | G06Q 10/107 715/810 |
| 2011/0320960 | A1* | 12/2011 | Cai | H04L 51/02 715/752 |
| 2013/0218896 | A1* | 8/2013 | Palay | H04L 51/16 707/741 |
| 2014/0280626 | A1* | 9/2014 | Girish | H04L 51/10 709/206 |
| 2015/0205876 | A1 | 7/2015 | Blume | |
| 2015/0281143 | A1* | 10/2015 | Wang | H04L 51/26 709/206 |
| 2015/0350147 | A1* | 12/2015 | Shepherd | H04L 51/24 715/752 |
| 2017/0048177 | A1* | 2/2017 | Offenhartz | H04L 51/16 |
| 2018/0054414 | A1* | 2/2018 | LeVasseur | G06F 21/445 |
| 2018/0121394 | A1* | 5/2018 | Denoue | G06F 3/013 |
| 2019/0005004 | A1 | 1/2019 | Lane et al. | |
| 2019/0140997 | A1* | 5/2019 | Lewin-Eytan | G06Q 10/107 |

OTHER PUBLICATIONS

"Non Final Office Action Issued in U.S. Appl. No. 14/801,067", dated Apr. 4, 2019, 19 Pages.
"Office Action Issued in European Patent Application No. 116726742.6", dated Oct. 22, 2019, 10 Pages.
Blum, et al., "Design of a Message Interworking Function for Converged IP Messaging in Next Generation Networks", In Proceedings of IEEE Symposium on Computers and Communications, Jul. 5, 2009, pp. 80-85.
Boyd, et al., "Tweet, Tweet, Retweet: Conversational Aspects of Retweeting on Twitter", In Proceedings of 43rd Hawaii International Conference on System Sciences, Jan. 1, 2010, pp. 1-10.
Kurtz, Lawson, "Slack on Rails", Retrieved from: https://www.viget.com/articles/slack-on-rails/, Apr. 17, 2015, pp. 1-13.
Tomayko, Ryan, "Mention @somebody. They're notified", Retrieved From: https://github.blog/2011-03-23-mention-somebody-they-re-notified/, Mar. 23, 2011, 5 Pages.
"Final Office Action Issued in U.S. Appl. No. 14/801,067", dated Oct. 1, 2019, 17 Pages.
"Office Action Issued in European Patent Application No. 16726741.8", dated Oct. 18, 2019, 8 pages.
Chihani, et al., "Enhancing Existing Communication Services with Context Awareness", In Journal of Computer Networks and Communications, vol. 3, No. 2, Jan. 10, 2012, 11 pages.
"Application programming interface—Wikipedia", https://en.wikipedia.org/wiki/Application_URL:https://en.wikipedia.org/w/index.php?title=Application_programming_interface&oldid=10524400, Feb. 23, 2005, 4 Pages.
Varghese, Shiju, "Commands, Command Händlers and Command Dispatcher", https://weblogs.asp.net/shijuvarghese/cqrs-commands-command-handlers-and-command-dispatcher, Oct. 19, 2011, 9 Pages.
"Office Action Issued in European Patent Application No. 16727059.4", dated Oct. 24, 2019, 9 Pages.
"Office Action Issued in European Patent Application No. 16726744.2", dated Oct. 24, 2019, 11 Pages.
Davis, et al., "Collaborative Editing using an XML Protocol", In Proceedings of IEEE Region 10 Conference TENCON, Nov. 21, 2005, 5 Pages.
Pasquier, et al., "A distributed editing environment for XML documents", https://arxiv.org/abs/0902.3136, Feb. 18, 2009, 14 Pages.
Takeda, et al., "Online workspaces for annotation and discussion of documents", In Proceedings of International Conference on Computers in Education, Dec. 3, 2002, 5 Pages.

* cited by examiner

UNIFIED MESSAGING PLATFORM AND INTERFACE FOR PROVIDING INLINE REPLIES

CROSS-REFERENCE TO RELATED APPLICATIONS

This application is a continuation of and claims priority to U.S. patent application Ser. No. 14/801,209, filed Jul. 16, 2015 and entitled "Unified Messaging Platform and Interface for Providing Inline Replies," which claims priority to U.S. Provisional Application Ser. No. 62/165,856, entitled "SYSTEM AND METHODS FOR IMPLEMENTING UNIFIED MESSAGING PLATFORM," filed on May 22, 2015, and U.S. Provisional Application Ser. No. 62/165,880, entitled "UNIFIED MESSAGING PLATFORM AND INTERFACE FOR PROVIDING RICH EMAIL MESSAGES," filed on May 22, 2015. The contents of these prior applications are considered part of this application, and are hereby incorporated by reference in their entirety.

BACKGROUND

Numerous and diverse communications platforms are currently available. Some communications platforms, e.g., messaging and/or email platforms, allow for a certain amount of interoperability. However, these platforms fail to adequately address the needs and requirements of contemporary team environments. For example, traditional email applications are configured such that each message is addressed to one or more recipients by the sender. It is often difficult for the sender to know which recipients would be interested in receiving certain information, which leads to message forwarding and/or overlooking relevant or key individuals. In the case of message forwarding, the communication chain becomes fractured, which results in disparate information being provided to various members of a team. Moreover, when certain members are overlooked and/or excluded, information that would be useful to the whole team is archived and acted on by only a subset of the team. The above deficiencies are compounded by the fact that email messaging is overused for too many purposes—e.g., from messages as basic as requesting approval from the recipient to messages attaching critical vision documents for an organization—which leads to overloaded inboxes and overwhelmed recipients.

Other communication tools and mediums have been developed to fill the gaps, such as instant messaging, short message service (SMS), Yammer, Skype, SharePoint, etc., but these tools add complexity rather than an overarching solution. For instance, while these additional communications tools are useful in point solutions, they also create the need for users to visit multiple locations to obtain a complete picture of related information, tasks and obligations.

It is with respect to these and other general considerations that embodiments have been described. Also, although relatively specific problems have been discussed, it should be understood that the embodiments should not be limited to solving the specific problems identified in the background.

SUMMARY

The disclosure generally relates to methods and systems for providing a unified messaging platform. The unified messaging platform provides a comprehensive environment for collaboration, file sharing, and project management. In aspects, the unified messaging platform is organized based on one or more teams or projects, where each team or project is further organized by customizable categories. A user interface is provided for ready access to information related to each category (e.g., communications, files, tasks, work product, etc.), which information is automatically and seamlessly synchronized across the platform such that each team member remains abreast of the current progress and status of a project. For instance, cooperation and collaboration are facilitated by features such as inline replies, which enable team members to comment on and reply to specific items within a single synchronized version of a message. These and other features will be detailed and described herein.

One aspect disclosed is a system including hardware processing circuitry and one or more electronic hardware memories storing instructions that configure the hardware processing circuitry to perform operations. The operations include scanning a message to identify a structure of first text content included in the message, the structure identifying at least one element of the first text content, the one element having a location within the first text content, receiving an indication selecting the one element, displaying a new text input field within the first text content at the location of the selected one element, receiving reply text content into the new input field, and sending a reply to the message, wherein the reply comprises the reply text content integrated into the message at the location. In some aspects, the operations also include identifying a recipient of the reply; and transmitting the structure to the recipient. In some of these aspects, the operations also include identifying an endpoint device associated with the recipient, determining whether the endpoint device is registered with a unified messaging application, and transforming a format of the structure to a second format in response to determining the endpoint device is not registered with the unified messaging application, wherein the structure is transmitted to the recipient in the second format. In some aspects, the operations also include identifying an endpoint device associated with the recipient, determining whether the endpoint device is registered with a third party email messaging application, and transforming a format of the structure to a second format in response to determining that the endpoint device is registered with the third party email messaging application, wherein the structure is transmitted to the recipient in the second format. In some of these aspects, the transforming comprises translating a notification included in the structure renderable by a receiving application.

In some of these aspects, the transforming includes translating the notification. In some aspects, the operations also include determining a plurality of applications including a registration of the endpoint device, determining a priority of the applications, wherein the transforming transforms the structure into the second format so as to be compatible with a highest priority application of the plurality of applications. In some of these aspects, the operations also include updating the priorities of the applications that include a registration of the endpoint device, and second transforming a different structure into another format so as to be compatible with a new highest priority application of the plurality of applications. In some of these aspects, the priorities are updated based on a relative frequency of use of each of the applications.

Another aspect disclosed is a method. The method includes scanning a message to identify a structure of first text content included in the message, the structure identifying at least one element of the first text content, the one element having a location within the first text content, receiving an indication selecting the one element, displaying a new text input field within the first text content at the location of the selected one element, receiving reply text content into the new input field; and sending a reply to the message, wherein the reply comprises the reply text content integrated into the message at the location.

Another aspect disclosed is a non-transitory computer readable storage medium comprising instructions that when executed configure hardware processing circuitry to perform operations. The operations include scanning a message to identify a structure of first text content included in the message, the structure identifying at least one element of the first text content, the one element having a location within the first text content, receiving an indication selecting the one element, displaying a new text input field within the first text content at the location of the selected one element, receiving reply text content into the new input field; and sending a reply to the message, wherein the reply comprises the reply text content integrated into the message at the location.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2A illustrates an exemplary interface for interacting with the unified messaging platform, according to an example embodiment.

FIG. 2B illustrates an exemplary interface for interacting with the unified messaging platform, according to a second example embodiment.

FIG. 2D illustrates an exemplary interface for interacting with the unified messaging platform, according to a fourth example embodiment.

FIG. 2E illustrates an exemplary interface for interacting with the unified messaging platform, according to a fifth example embodiment.

FIG. 6 illustrates an exemplary interface for notifying a user of a user callout in a message, according to an example embodiment.

FIG. 7A illustrates an exemplary interface for resolving a user callout for inclusion in a message, according to an example embodiment.

FIG. 9 illustrates an exemplary interface for initiating an inline reply in a message, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In particular, a unified messaging platform is described which provides a comprehensive environment for collaboration, file sharing, and project management. In aspects, the unified messaging platform is organized based on one or more teams or projects, with each team or project further organized by customizable categories, such as finance, engineering, launch readiness, debugging, catering, construction, general, random, and the like. A user interface is provided for ready access to information related to each category (e.g., communications, files, tasks, work product, etc.), which information is organized by pages or tabs for each category. Moreover, documents, project updates, tasks, and communications between team members are automatically and seamlessly synchronized across the platform such that each team member remains abreast of the current progress and status of a project. For instance, the unified messaging platform facilitates collaboration by features such as inline replies, which enable team members to provide comments, updates or replies to specific items, topics, or requests within a single synchronized version of a message. It is with respect to these and other general considerations that embodiments have been made.

Figure 1:
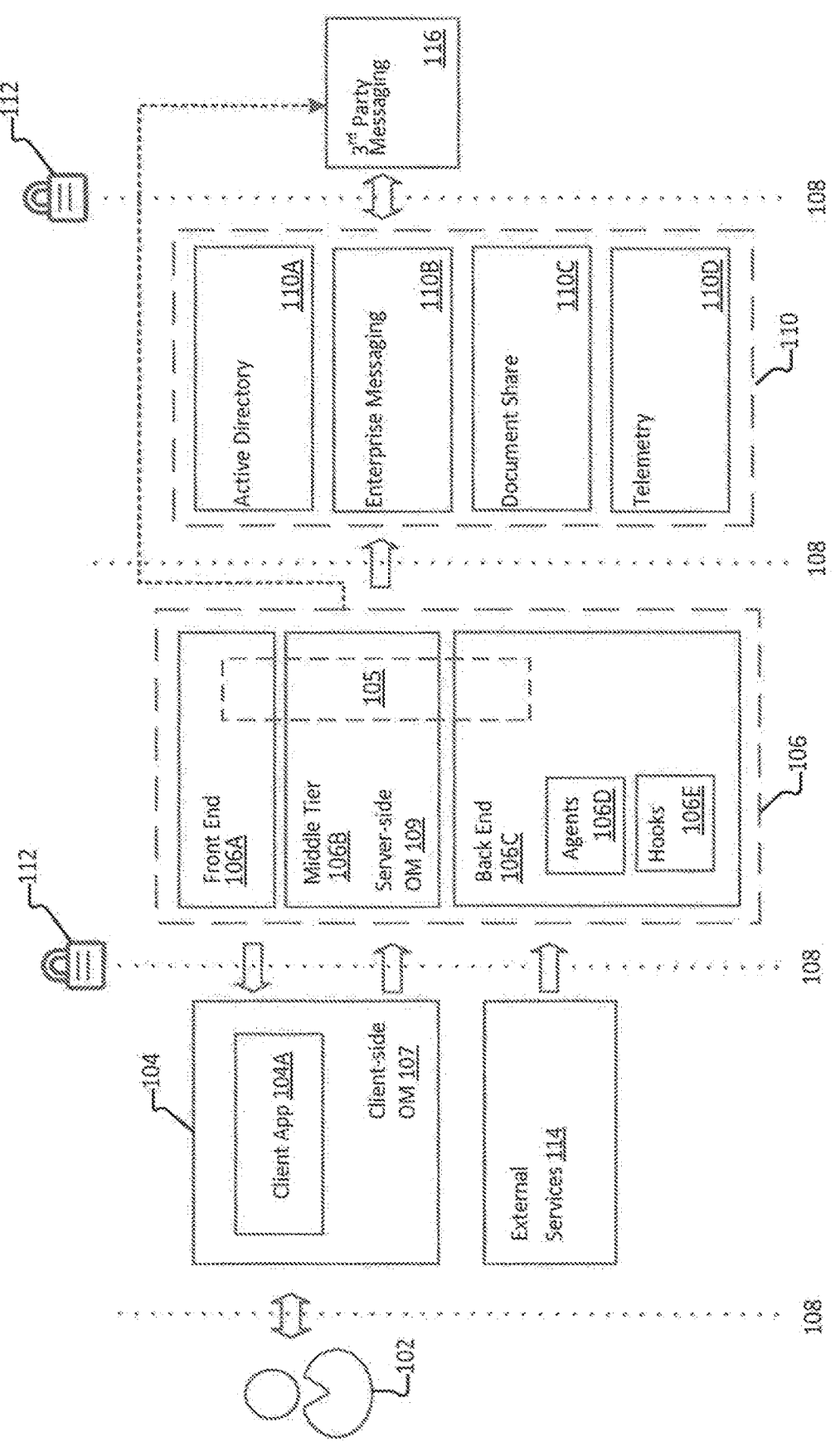
FIG. 1 illustrates an exemplary conceptual model for a unified messaging platform, according to an example embodiment.

FIG. 1 illustrates an exemplary system for providing a unified messaging platform, according to an example embodiment.

In aspects, a unified messaging platform (UMP) 105 may be implemented via a client unified messaging application 104a executed on client computing device 104 in communication with a server unified messaging application executed on a server computing device 106. In some aspects, the client computing device 104 may comprise a client-side object model 107 in communication with a server-side object model 109 (e.g., implemented by middle tier 106b). In a basic configuration, the client computing device 104 is a personal or handheld computer having both input elements and output elements. For example, the client computing device 104 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list is exemplary only and should not be considered as limiting. Any suitable client computing device for executing a messaging application may be utilized.

The unified messaging platform 105 is a communication system/service that provides a collaborative environment for users to communicate and collaborate. The unified messaging platform 105 is shown by a dashed line, illustrating that implementation of the unified messaging platform 105 may involve the front end 106a, middle tier 106b and/or the back end 106c of server computing device 106, among other examples. In aspects, server computing device 106 may include one or more server computing devices 106. In an example the unified messaging platform 105 presents a configurable and extensible workspace for collaboration between users through a user interface (UI) that may comprise a plurality of different views. Users of the unified messaging platform 105 may be include but are not limited to: one or more persons, companies, organizations, departments, virtual teams, ad-hoc groups, vendors, customers, third-parties, etc. Users of the unified messaging platform 105 may have one or more user profiles that are customizable by the user. The unified messaging platform 105 enables visibility and communication between users including users who are organized in teams or groups as well as users/groups outside of a team/group. Policies may be set for teams/groups by one or more administrators of a team/group and by administrators of the unified messaging platform 105. Examples described throughout the present disclosure are designed to accommodate to protect user privacy. Protection of sensitive information, including legally protected data and personally identifiable information, is a paramount consideration for implementing examples described herein. For instance, users may set privacy settings for what data that can displayed/shared, and examples described herein comply with such settings as well as laws related to distribution of data and protection of privacy.

As illustrated in FIG. 1, systems and/or services associated with the unified messaging platform 105 may be implemented as a front end 106a, a middle tier 106b, and a back end 106c on a server computing device 106. However, one skilled in the art will recognize that the unified messaging platform 105 may be implemented across one or more components of system examples described herein, including one or more client computing devices 104 and/or enterprise stack 110. In some aspects, the front end 106a of server computing device 106 may send information and commands via the client unified messaging application 104a to the client computing device 104. For instance, the middle tier 106b and/or the back end 106c of the server computing device 106 may receive information and commands from the client computing device 104 via the client unified messaging application 104a. In other aspects, the front end 106a may act as an intermediary between the client computing device 104 and the middle tier 106b. That is, front end 106a may exchange commands and information with the client computing device 104 and may also exchange the commands and information with middle tier 106b. In an example, the unified messaging platform 105 includes a server unified messaging application executing on server computing device 106 via front end 106a, middle tier 106b, and a back end 106c in communication with the client unified messaging application 104a.

In some aspects, the back end 106c may further comprise or be in communication with one or more application agents 106d to facilitate interoperability and communication with one or more external services 114. More specifically, application agents 106d may interface with external services 114 using webhooks 106e in order to facilitate integration between the unified messaging platform 105 and external services 114. External services 114 are services and/or websites that are hosted or controlled by third parties. For example, external services 114 may include line-of-business (LOB) management services, customer relationship management (CRM) services, debugging services, accounting services, payroll services, etc. External services 114 may further include other websites and/or applications hosted by third parties, such as social media or networking websites; photo sharing websites; video and music streaming websites; search engine websites; sports, news or entertainment websites, and the like. That is, some external services 114 may provide robust reporting, analytics, data compilation and/or storage service, etc., whereas other external services 114 may provide search engines or other access to data and information, images, videos, and the like.

In aspects, data or information may be shared between server computing device 106 and the one or more external services 114. For example, business contacts, sales, etc., may be input via a client computing device 104 in communication with server computing device 106, which is in communication with CRM software hosted by a third party. The third party CRM software may track sales activity, marketing, customer interactions, etc., to provide analytics or other information for promoting business relations. Alternatively, a manufacturing work order may be input via a client computing device 104 in communication with server computing device 106, which is in communication with LOB management software hosted by a third party. The LOB management software may guide and track the work order by creating work flows such as tasks or alerts for scheduling manufacturing equipment, ordering raw materials, scheduling shipping, relieving inventory, etc. In some cases, the LOB management software may create requests for user approval or review at different stages of a work flow. In still further aspects, a user may issue a query to one or more of the external services 114, such as a request for business contacts, sales for the prior month, the status of a work order, or a search query or request for an image, etc.

As illustrated by FIG. 1, the server computing device 106 may communicate with external services 114 and client computing device 104 via a network 108. In one aspect, the network 108 is a distributed computing network, such as the Internet. In aspects, the unified messaging platform 105 may be implemented on more than one server computing device 106, such as a plurality of server computing devices 106. As discussed above, the server computing device 106 may provide data to and from the client computing device 104 through the network 108. The data may be communicated over any network suitable to transmit data. In some aspects, the network 108 is a computer network such as an enterprise intranet and/or the Internet. In this regard, the network 108 may include a Local Area Network (LAN), a Wide Area Network (WAN), the Internet, wireless and wired transmission mediums. In further aspects, server computing device 106 may communicate with some components of the system via a local network (e.g., an enterprise intranet), whereas server computing device 106 may communicate with other components of the system via a wide area network (e.g., the Internet).

According to further aspects, communication between the unified messaging platform 105 and other components of the system may require authentication 112. Authentication 112 refers to a process by which a device, application, component, user, etc., provides proof that it is "authentic" or that it is "authorized" to access or communicate with another device, application, component, user, etc. Authentication may involve the use of third party digital certificates, authentication tokens, passwords, symmetric or asymmetric key encryption schemes, shared secrets, authentication protocols, or any other suitable authentication system or method either now known or developed in the future. In aspects, in response to authentication, access or communication may be allowed and data or information may be exchanged between the unified messaging platform 105 and various other components of the system. In some aspects, an environment or network linking various devices, applications, components, users, etc., may be referred to as a "trusted" environment. In a trusted environment, authentication between devices, applications, components, users, etc., may not be necessary.

The unified messaging platform 105 executing operations on the server computing device 106 may further be in communication with one or more enterprise applications (e.g., enterprise stack 110). Enterprise stack 110 may include, for example, an active directory 110a, an enterprise messaging application 110b, a file sharing application 110c, a telemetry application 110d, and the like. The enterprise stack 110 may be stored and/or executed locally, e.g., within an enterprise intranet, or in distributed locations over the Internet. In some cases, enterprise stack 110 may be included within server computing device 106. For example, active directory 110a may be included as part of back end 106c of server computing device 106. In some instances, enterprise stack 110 may reside or communicate with the unified messaging platform 105 within a trusted environment. In aspects, information and/or messages received, sent or stored via the unified messaging platform 105 may be communicated to the enterprise stack 110. Moreover, information and/or messages received, sent or stored via the enterprise stack 110 may be communicated to the unified messaging platform 105.

Additionally, in some aspects, the unified messaging platform 105 executing on the server computing device 106 may be in communication with one or more third party messaging applications 116. Third party messaging applications 116 are messaging applications that are hosted or controlled by third parties, including third party email messaging applications, SMS applications, instant messaging applications, social networking applications, and the like. In aspects, some users who are members of a team may be registered with the unified messaging platform 105 (e.g., internal users), whereas other users who are members of the team may not be registered with the unified messaging platform 105 (e.g., external users) but may be registered with one or more third party messaging applications 116. In some aspects, users who are registered with an enterprise messaging application 110b, but not with the unified messaging platform 105, are considered external users. In this case, the unified messaging platform 105 may communicate with one or more third party messaging applications 116 and/or with one or more enterprise messaging applications 110b to exchange information and messages with external users. In some aspects, communication between the unified messaging platform 105 and the one or more third party messaging applications 116 and/or the one or more enterprise messaging applications 110b over network 108 may involve authentication 112. In other aspects, communication between the unified messaging platform 105 and, for example, the one or more enterprise messaging applications 110b, may not involve authentication 112.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2A:
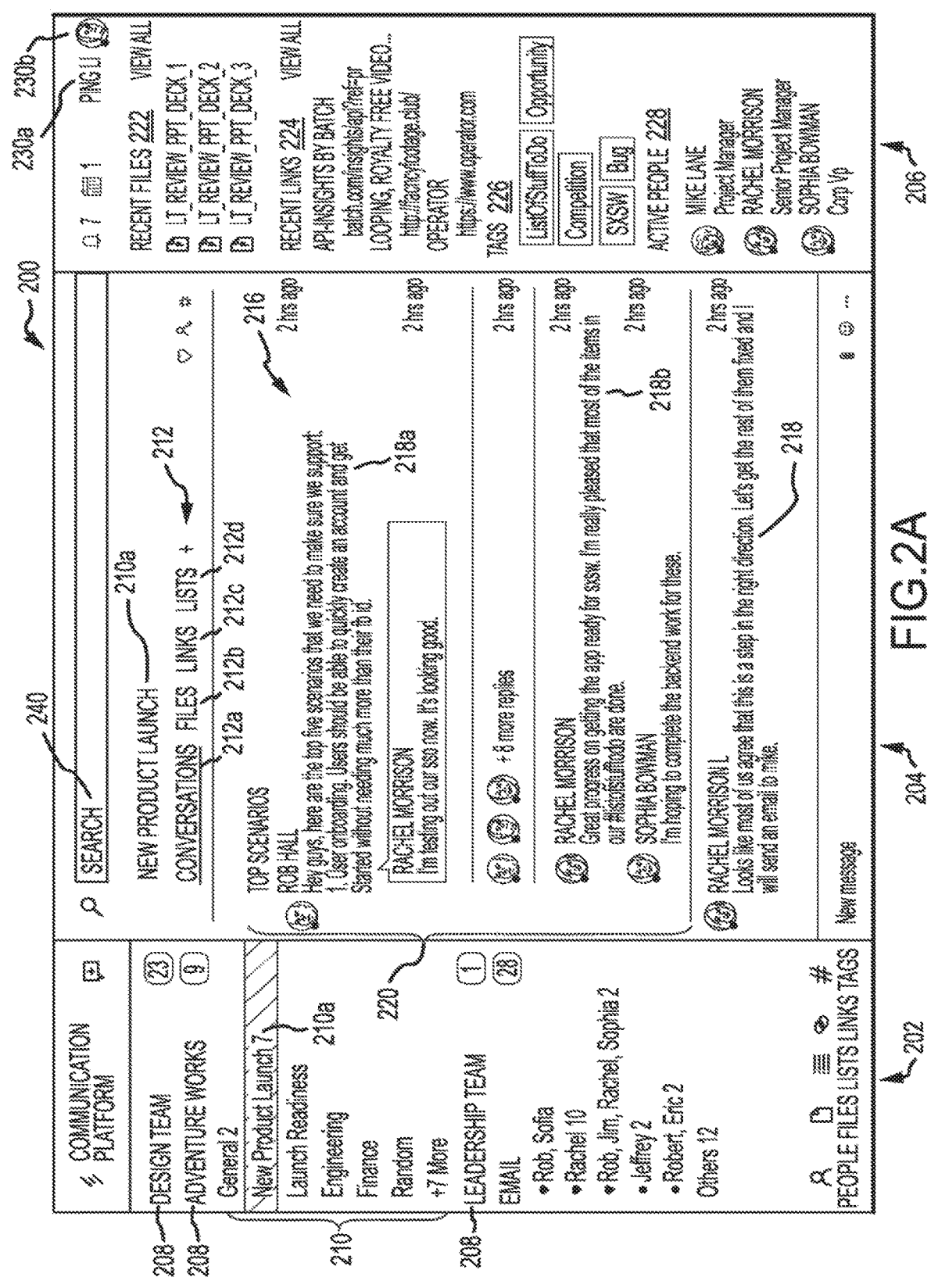

FIG. 2A illustrates an exemplary interface for interacting with the unified messaging platform, according to a first example embodiment.

In aspects, a user may interact with a unified messaging platform via a user interface 200, e.g., a graphical user interface. An exemplary unified messaging platform 105 is provided in the description of FIG. 1, and further described throughout the rest of the present disclosure such as in FIGS. 2A-2G, among other examples. In some aspects, the user interface 200 may involve one or more panes or windows for organizing the display of information and/or interactive controls. In one example, the user interface 200 may include three panes, e.g., a left rail 202, a center pane 204, and a right rail 206. In another example, the user interface 200 may include two panes, e.g., a left rail and a right rail. In still other examples, the user interface 200 may include one pane, four or more panes, and/or panes may be embodied in multiple browser or application windows.

As detailed above, each pane or window may display information in the form of text, graphics, etc., and/or one or more interactive controls or links. For example, a first pane, e.g., left rail 202, may display one or more teams 208, an email portal, etc. As used herein, a team refers to any group of two or more users formed for one or more purposes. A team may be formed for any conceivable purpose or purposes, e.g., a business purpose, a social purpose, a charitable purpose, and the like. Moreover, a team may comprise any type of user, e.g., coworkers, family members, classmates, business associates, and the like. In aspects, a team may be formed within the unified messaging platform 105 by creating a team title, e.g., leadership team, design team, event team, project team, etc., and adding users (e.g., members) to the team. For example, in a settings or administration pane (not shown), members may be added to the team by selecting an identifier of a user, e.g., a user icon, a user email, a user phone number, etc. In at least some aspects, each member of a team is granted access to a team portal or channel. Furthermore, any number of teams may be created within the unified messaging platform 105 and/or teams may be implicitly created based on communications between two or more users.

A team portal may provide access to all communications, files, links, lists, hashtags, development tools, etc., shared by any member of a team. According to embodiments, in response to a selection (e.g., by clicking) of a team 208 within a pane, e.g., the left rail 202, a team portal may be opened. A team portal refers to an access point through which team members can view and interact with shared information and other team members. In at least some cases, each member of a team is granted full access to the information and conversations shared within the team portal. In aspects, in response to a selection of a team 208, general information regarding the team, project specifications, etc., may be displayed in a second pane, e.g., center pane 204. For example, member names, member contact information (e.g., email addresses, phone numbers, etc.), member usage time, project specifications, project time lines, project mission, and the like, may be displayed in the center pane 204.

A team portal may be further organized based on customizable categories 210 of information for a team 208. For example, any suitable category 210 for organizing team information may be created for a team portal, e.g., finance, engineering, launch readiness, debugging, catering, construction, general, random, and the like. In aspects, information related to a category 210 may be displayed in center pane 204 in response to selecting a category 210 of a team 208 within left rail 202. In some instances, each member of a team is granted full access to information associated with each category 210 of a team 208 within the team portal.

As noted above, a team portal may provide access to all communications, files, links, lists, hashtags, etc., shared by members of a team 208. In aspects, within each category 210, information may further be organized by tabs or pages. For example, each tab 212 may display a different type of information associated with a category 210 in the center pane 204. When selected, a tab 212 may be identified by highlighting, with a different font or font color, by outlining, underlining, etc. As illustrated by FIG. 2A, in response to selection of a first tab (e.g., conversations tab 212a, denoted by underlining), communications 218 between team members may be displayed in center pane 204. As used herein, the term "communication" may be used interchangeably with the term "message." In aspects, a conversation 216 entails two or more communications 218 of any type or mode between team members. In some cases, a conversation 216 may be displayed in ascending order with the most recent communication 218 displayed at the bottom of the center pane 204. Alternatively, a conversation 216 may be displayed in descending order with the most recent communication 218 displayed at the top of the center pane 204.

In some cases, described further below, one or more communications 218 (e.g., communications 218a and 218b) may be grouped as a conversation thread 220. A communication 218 refers to a single message transmitted by a team member in any format (e.g., email, SMS, instant message, etc.) via any mode (e.g., via the unified messaging platform, or via any enterprise or third party messaging application). That is, messages may be generated within the unified messaging platform between internal users or messages may be communicated to and from external users via enterprise messaging applications (e.g., enterprise messaging application 110b) and/or third party messaging applications (e.g., third party messaging applications 116).

As provided above, each pane or window may display information and/or interactive controls. For example, a third pane, i.e., right rail 206, may display context information, status information, recent activity, and the like. In some aspects, information displayed in the right rail 206 may be related to or associated with the category 210 selected in the left rail 202 and/or the tab 212 selected in the center pane. For instance, where the center pane 204 displays communications, files, links, lists, hashtags, etc., related to a category 210a entitled "New Product Launch," the right rail 206 may display one or more recent files 222, recent links 224, tags 226, or active people 228 related to the New Product Launch. In some aspects, at least some of the information displayed in the right rail 206 may be specific to a particular user (e.g., the particular user accessing the team portal via a client computing device 104, "accessing user"). For example, the particular user accessing the team portal may be identified by a name, icon, or the like, within right rail 206, such as user name 230a or user icon 230b. That is, in some cases, the recent files 222 and/or recent links 224 related to the New Product Launch may have been recently accessed or uploaded by the accessing user. Moreover, the right rail 206 displayed for another user accessing the same category 210 may display a different set of recent files 222 or recent links 224. In further examples, additional or different information relevant to a category 210 and a particular user may be displayed in the right rail 206, e.g., user tasks, user alerts, user calendar, user notes, etc.

According to additional aspects, center pane 204 may include a search field 240. For example, search field 240 may allow a user to search within a team portal for any communication, file, link, list, hashtag, term, team member, calendar, task, event, and the like, related to a team 208. In aspects, search field 240 may allow for plain language searching, Boolean searching (e.g., searching using Boolean operators), or otherwise. In response to entering one or more search terms into the search field 240, any information related to the search terms within the team portal may be displayed as search results to the accessing user.

As should be appreciated, the various features and functionalities of user interface 200 described with respect to FIG. 2A are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2B:
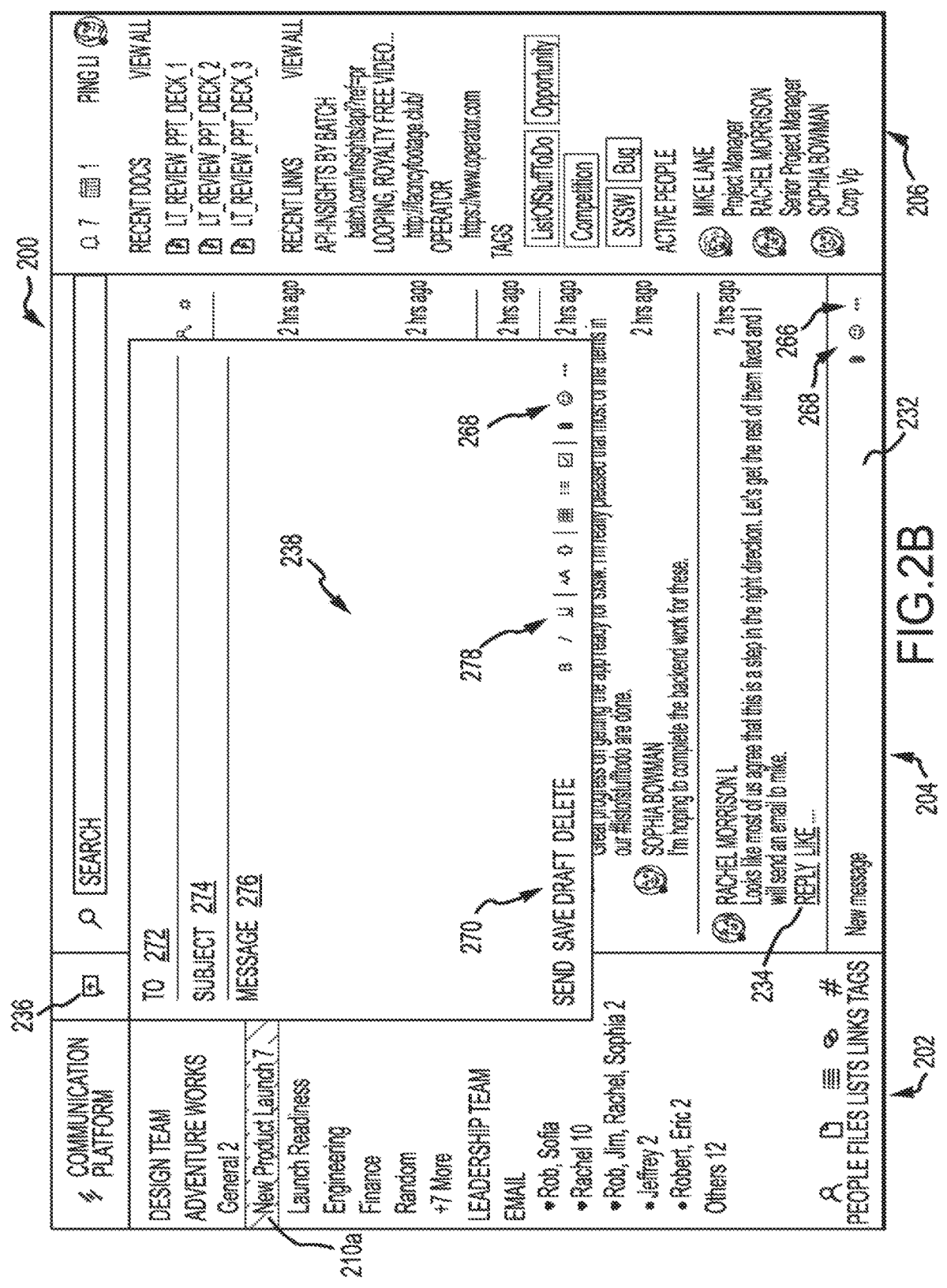

FIG. 2B illustrates an exemplary interface for interacting with the unified messaging platform, according to a second example embodiment.

As described above, the unified messaging platform may provide a user interface 200 including three panes, e.g., a left rail 202, a center pane 204, and a right rail 206. As illustrated by FIG. 2B, the unified messaging platform may provide a variety of options for generating communications. For example, the unified messaging platform may provide a new message input field, e.g., new message input field 232, for sending an instant message, SMS, or other "text-like" communication. In aspects, new message input field 232 may allow entry of text, entry of commands, entry of user callouts, entry of hashtags, entry of images, entry of rich web content, entry of rich interactive content, etc. New message input field 232 may further include controls 268 for attaching files, inserting emoticons, etc. However, in at least some aspects, new message input field 232 may not provide for entry of recipients or a subject line. In response to inputting a message into a new message input field 232 and hitting "send" or "enter," a communication from a user may automatically post to a conversation as a new "text-like" message. According to further aspects, new message input field 232 may include optional controls 266 (denoted as an ellipsis) for expanding the new message input field 232 into an email interface object (e.g., email interface object 238 described below).

Alternatively, the unified messaging platform may provide a reply link 234 associated with each communication of a conversation. In some aspects, reply link 234 is displayed near each communication of a conversation, e.g., to the right of a sender or subject line for a communication (not shown), indented below a communication (shown), up and to the right of a communication (not shown), and the like. Alternatively, reply link 234 may not be displayed unless and until a communication is clicked, hovered over, touched or otherwise identified with an input device (e.g., mouse, pointer, etc.). In response to display and selection of a reply link 234 associated with a particular communication, a message reply input field may be displayed (not shown). Similar to the new message input field 232, the message reply input field may allow entry of text, entry of commands, entry of hashtags, attachment of files, insertion of emoticons, etc. However, in this case, in response to inputting a message and hitting "send" or "enter," a communication from the user may automatically post within a conversation thread 220 associated with the particular communication. In aspects, as illustrated by FIG. 2A, secondary communications 218b within a conversation thread 220 may be displayed as indented, bulleted, or otherwise offset below a primary or initial communication 218a (in above example, the "particular communication" may be referred to as a "primary communication").

Alternatively still, the unified messaging platform may provide an email control 236 for accessing an email interface object, e.g., email interface object 238, to send "email-like" communications. In aspects, email interface object 238 may allow similar actions to new message input field 232, such as an input field 276 for entry of text, entry of commands, entry of hashtags, etc., and controls 268 for attachment of files, insertion of emoticons, etc. Additionally, email interface object 238 may provide controls 278 for altering text font and size, bulleting text, etc., and controls 270 for sending, saving a draft email, deleting, etc. Email interface object 238 may further provide a recipient field 272 for inputting or selecting recipients and a subject field 274 for inputting a subject line, and the like. In response to inputting a message into an email interface object 238 and hitting "send" or "enter," a communication from the user may automatically post to the conversation as a new "email-like" message.

As should be appreciated, the various features and functionalities of user interface 200 described with respect to FIG. 2B are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2C:
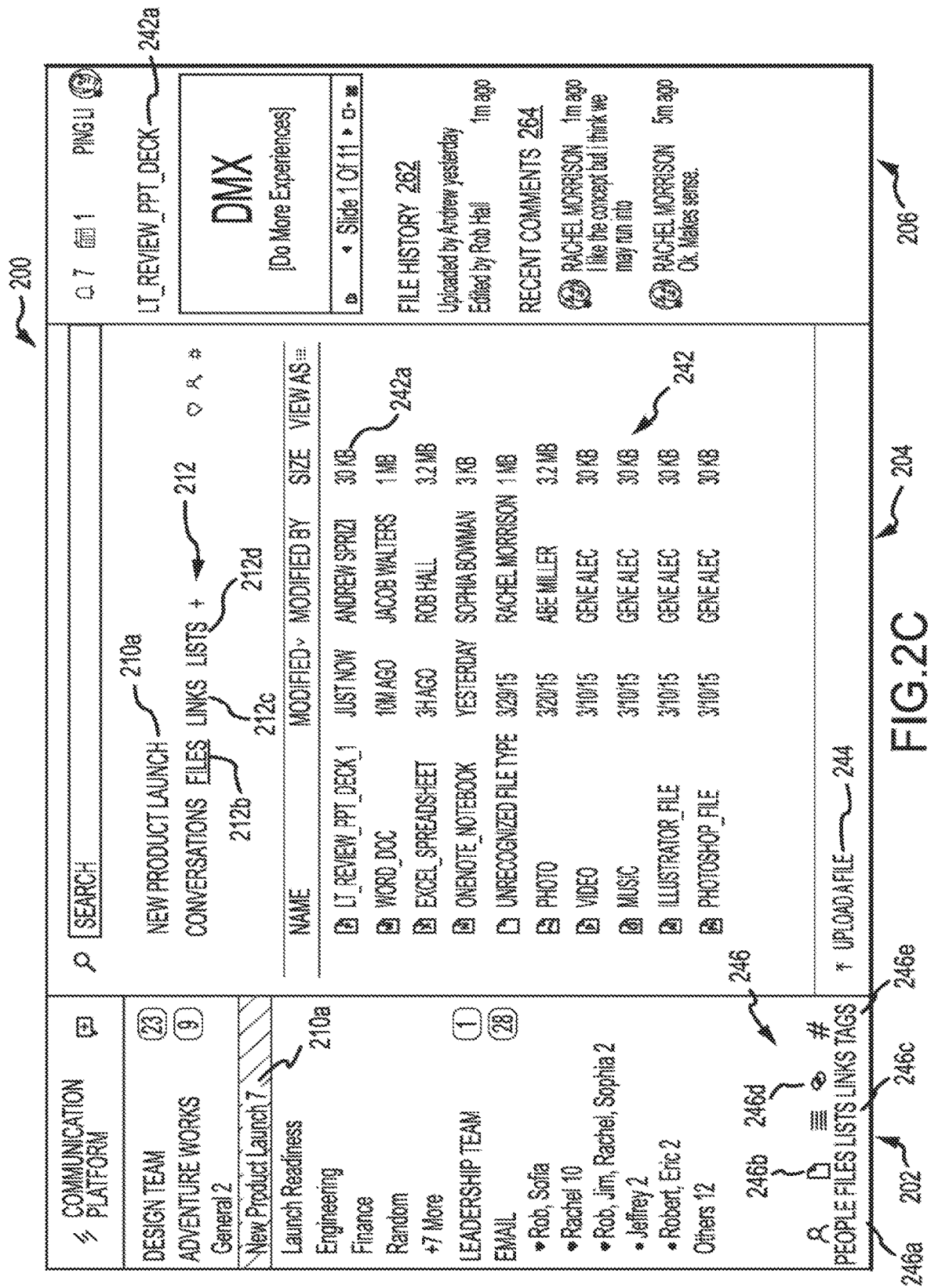
FIG. 2C illustrates an exemplary interface for interacting with the unified messaging platform, according to a third example embodiment.

FIG. 2C illustrates an exemplary interface for interacting with the unified messaging platform, according to a third example embodiment.

As described above, the unified messaging platform may provide a user interface 200 including three panes, e.g., a left rail 202, a center pane 204, and a right rail 206. Moreover, as described above, each tab 212 may display a different type of information associated with a category 210a in the center pane 204. For example, as illustrated by FIG. 2C, a second tab (e.g., files tab 212b) may be selected (denoted by underlining) to display files 242 shared between team members. Files 242 may include any type of file, e.g., document files, spreadsheet files, presentation files, image files, video files, audio files, note files, and the like.

In some aspects, files 242 displayed in files tab 212b include files that were sent as attachments to communications 218 between team members. That is, the unified messaging application may extract files sent as attachments and automatically save them in files tab 212b. In other aspects, as illustrated by FIG. 2C, a file upload field 244 may be provided. In response to selecting file upload field 244, one or more files 242 may be saved to the files tab 212b by a user. For example, in response to selection of file upload field 244, a browsing box (not shown) may be activated for retrieving a file for upload. Alternatively, a command may be entered (e.g., "/file") for retrieving a file for upload. Alternatively still, a file may be copied and pasted into file upload field 244. In aspects, any suitable method for uploading and saving a file to the files tab 212b may be implemented. In at least some aspects, a single version of a first file with a first file name exists in files tab 212b such that any revisions, edits, annotations, etc., made to the first file are synchronized and stored within the single version. In some aspects, in response to saving the first file with a second file name, a second file can be created, attached, and/or uploaded to files tab 212b.

According to further examples, a third tab (e.g., links tab 212c) may display links (e.g., hyperlinks) shared between team members. In some aspects, links displayed in the links tab 212c include links that were sent within the body of a communication or as attachments to a communication between team members. That is, the unified messaging application may extract links sent within or as attachments to communications and may automatically save them to the links tab 212c. In other aspects, a link upload field (not shown) may be provided. In response to selecting the link upload field, one or more links may be saved to the links tab 212c by a user. For example, in response to selection of a link upload field, a browsing box (not shown) may be activated for retrieving a link for upload. Alternatively, a command may be entered (e.g., "/link") for retrieving a link for upload. Alternatively still, a link may be copied and pasted into the link upload field. In aspects, any suitable method for uploading and saving a link to the links tab 212c may be implemented.

A fourth tab (e.g., lists tab 212d) may display list objects and/or other information, data, files, images, etc., shared between team members. In aspects, list objects may include lists, tables, charts, or other organized forms of data. In some aspects, list objects displayed in lists tab 212d include list objects that were sent within the body of a communication 218 or as an attachment to a communication 218 between team members. That is, the unified messaging application may extract list objects sent as attachments or within a message body and automatically save them to lists tab 212d. As used herein, a message body refers to content displayed within a communication (e.g., excluding recipient, sender, time stamp, subject information, confidentiality disclaimer, etc.) that need not be activated or opened for viewing.

In other aspects, a list object may be created or uploaded by a user within lists tab 212d. For example, a list creation control (not shown) may be provided for creating a list object. In some cases, in response to selecting the list creation control, a list object may be created and inserted in a message body and/or attached to a message. In response to creating the list object, the list object may be automatically saved to the lists tab 212d. Alternatively, a list upload field (not shown) may be provided. In response to selecting a list upload field, one or more list objects may be selected, uploaded and saved to the lists tab 212d by a user, as described similarly above. In at least some cases, a single copy of each list object may exist such that if data is updated in any view, e.g., within the communications tab 212a or the lists tab 212d, the list object is automatically updated and synchronized across all other views.

According to aspects, any number of tabs 212 may be created for organizing and sequestering various forms of information related to a category 210a. For example, a hashtag tab may be included to store various hashtags created within communications between team members. In additional examples, custom or extensibility tabs may be created, e.g., a tab for a spreadsheet dashboard, a tab for a webpage, a tab for a custom application, a tab for a system plugin, and the like.

In further aspects, additional interactive controls or links (e.g., controls 246) may be provided, e.g., in left rail 202, for quickly and easily accessing communications, files, lists, links, tags, etc., related to a team 208. For example, people control 246a may access team members and/or conversations stored in the team portal, files control 246b may access files stored in the team portal, lists control 246c may access lists stored in the team portal, links control 246d may access links stored in the team portal, and hashtags control 246e may access hashtags stored in the team portal. In some aspects, selection of a control 246 may display a corresponding tab view within the center pane 204. In other aspects, selection of a control 246 may display results for all categories within a team portal, e.g., in the form of search results associated with a particular control 246.

As illustrated by FIG. 2C, in response to selection of a files tab 212b, the right rail 206 may display different information than when a different tab 212 is viewed in center pane 204. For example, selecting or highlighting a file 242a in center pane 204 may cause information related to file 242a to be displayed in the right rail 206. For instance, a file history 262 for the file 242a may be displayed in the right rail 206. The file history 262 may include information such as a user identifier for a user who uploaded the file 242a, a user who authored the file 242a, a user who edited the file 242a, a file creation date, a file revision date, and the like. The right rail 206 may further display recent comments 264 regarding file 242a. In aspects, any information related to file 242a may be displayed in right rail 206.

As should be appreciated, the various features and functionalities of user interface 200 described with respect to FIG. 2C are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2D:
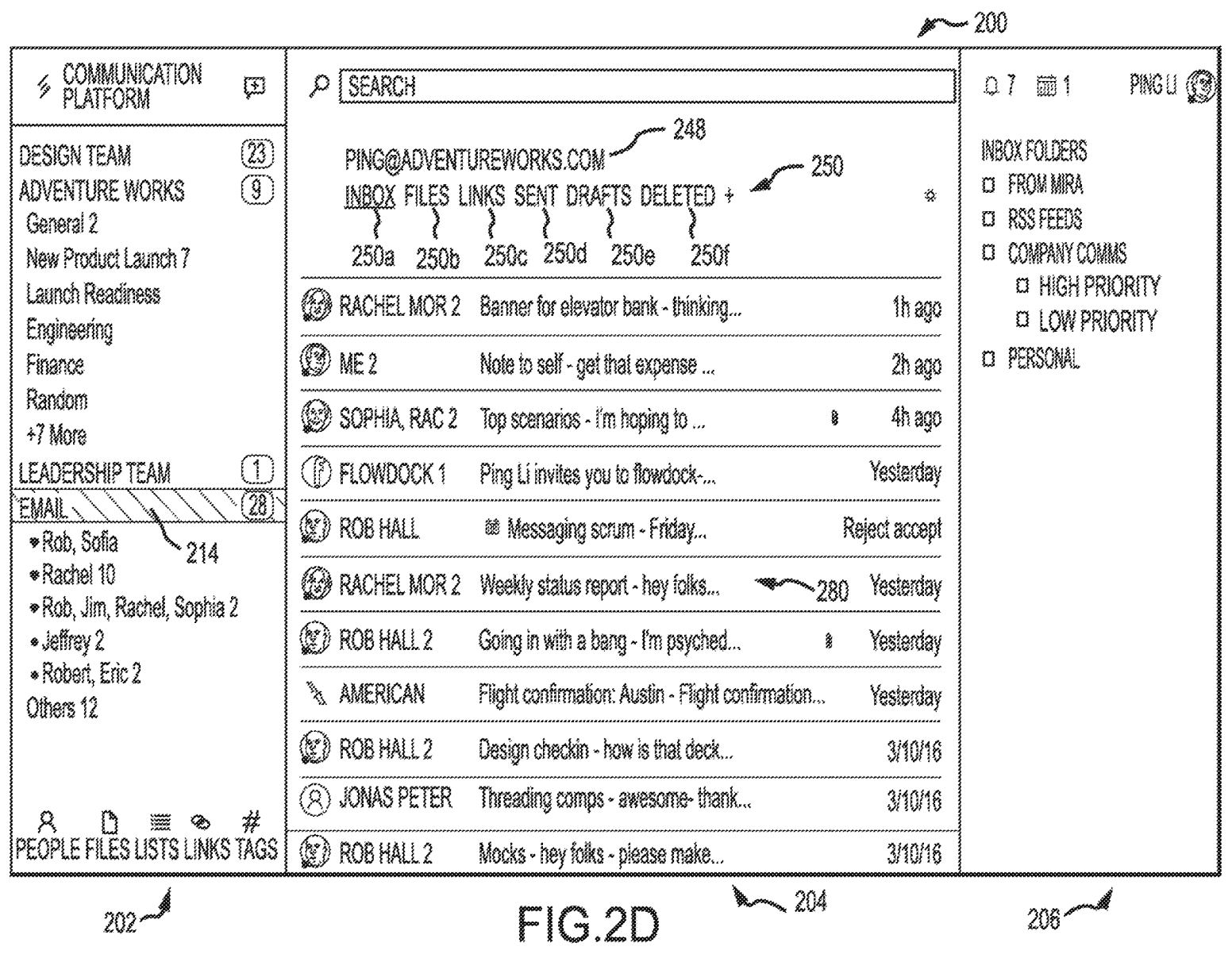

FIG. 2D illustrates an exemplary interface for interacting with the unified messaging platform, according to a fourth example embodiment.

As described above, the unified messaging platform may provide a user interface 200 including three panes, e.g., a left rail 202, a center pane 204, and a right rail 206. In further aspects, the left rail 202 may include an email portal 214. Unlike a team portal, email portal 214 may be an access point through which a particular user can view and interact with his or her email messages inside or outside of the context of a team. In aspects, in response to selection of email portal 214, a second pane, e.g., center pane 204, may display a user's email messages. Center pane 204 may further display a user identifier 248 as a header, e.g., a user email address, a user name, a user icon, and the like. Center pane 204 may provide one or more tabs 250 for organizing the user's email messages. Tabs 250 may include, for instance, an inbox tab 250a, a files tab 250b, a links tab 250c, a sent tab 250d, a drafts tab 250e, a deleted tab 250f, and the like. For example, a user's inbox of messages may be displayed in the center pane 204 in response to selection of inbox tab 250a (denoted by underlining). In some aspects, the user's inbox of messages may include all messages sent to the user, e.g., messages between team members, including internal and external users, as well as messages between entities and users that are not team members.

In some aspects, the user's email messages 280 in inbox tab 250a may be displayed in a summary list format (shown) in descending order based on a date the email message was received with the most recent email message displayed at the top of center pane 204. The summary list format may display a portion of each email message, e.g., a sender, a subject line, and a portion of text for each email message.

In alternative aspects, the user's email messages in inbox tab 250a may be displayed in a conversation thread format (not shown). A conversation thread format (e.g., presentation structure) may display email messages which are replies to a primary email message below the primary email message, and/or indented, bulleted, or otherwise offset within the conversation thread. Additionally or alternatively, a reply to a primary email message may be displayed in a different font (e.g., bold, italics, colored, etc.), may be displayed in a reply bubble within the conversation thread, and the like. In at least some aspects, each conversation thread may be displayed in descending order based on a date the last email message in the conversation thread was received, with the most recent conversation thread displayed at the top of center pane 204. In this case, individual communications (e.g., communications that have not been replied to) may be interspersed among and between conversation threads in descending order based on a date the individual communication was received. In other aspects, each conversation thread may be displayed in ascending order based on a date the last email message in the conversation thread was received with the most recent conversation thread displayed at the bottom of center pane 204. In this case, individual communications may be interspersed among and between conversation threads in ascending order based on a date the individual communication was received.

For example, a message (e.g., primary communication) received at a first time may be displayed in an ascending or descending order within a conversation based on the first time. When a reply to the message (e.g., secondary communication) is received at a second time, the message and the reply may be displayed as a conversation thread, as described above. Moreover, the conversation thread may be displayed in an ascending or descending order within the conversation based on the second time. In this case, the message (as displayed in the conversation thread) may be reordered within the conversation based on a time of receipt of the reply, e.g., the second time. In further aspects, as described above, the reply to the message may be received from a user registered with the unified messaging application, or from a user registered with a third party messaging application, including third party email messaging applications, SMS applications, instant messaging applications, social networking applications, and the like.

In further aspects, email messages that have been opened or viewed may be displayed within the in inbox tab 250a of center pane 204 with normal text, whereas email messages that have not been opened or viewed may be displayed within the center pane 204 with at least portions of the email message in bold text (e.g., a sender and/or a subject line may be displayed with bold text).

As should be appreciated, the various features and functionalities of user interface 200 described with respect to FIG. 2D are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2E:
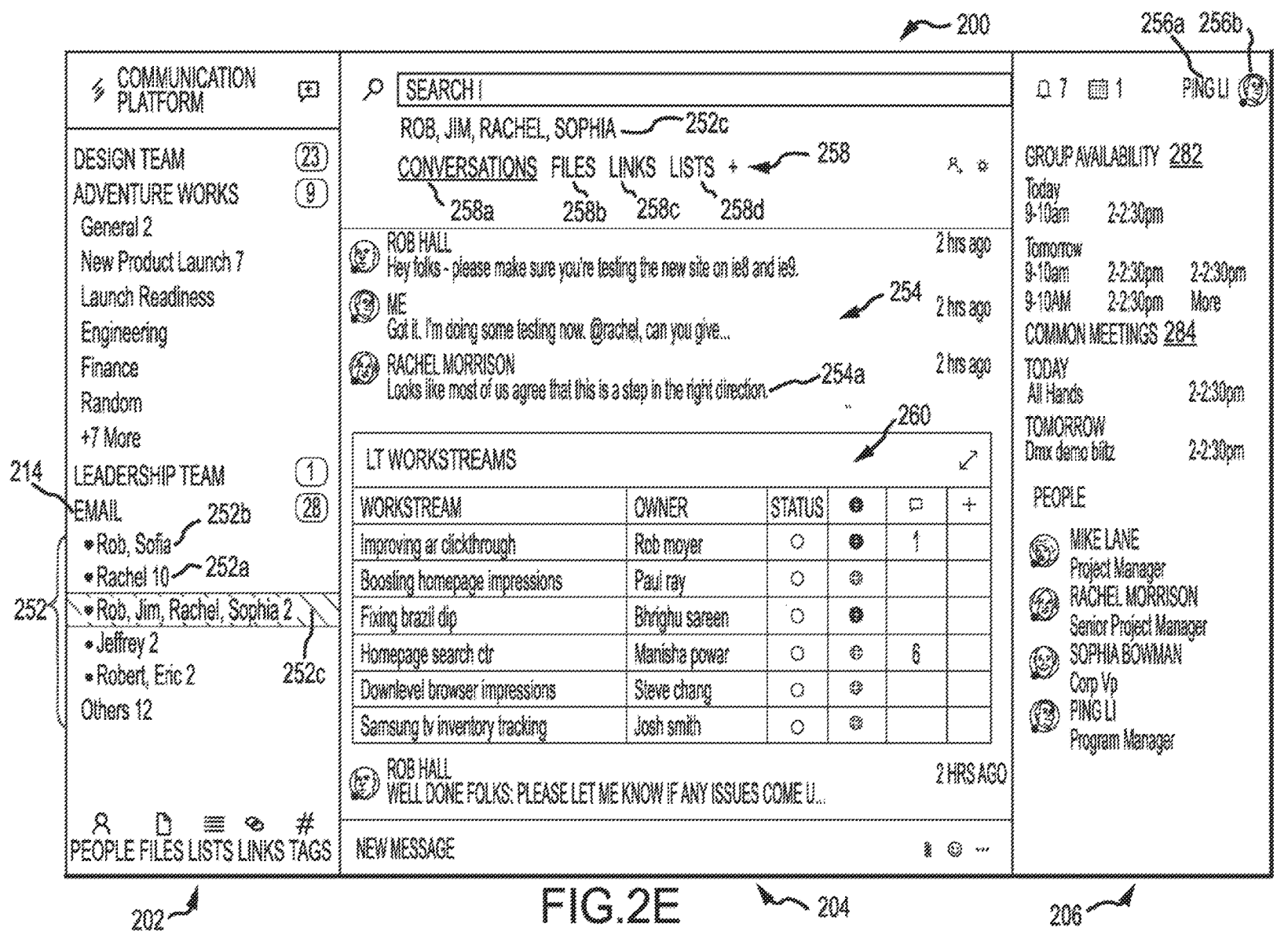

FIG. 2E illustrates an exemplary interface for interacting with the unified messaging platform, according to a fifth example embodiment.

As described above, the unified messaging platform may provide a user interface 200 including three panes, e.g., a left rail 202, a center pane 204, and a right rail 206. As described above, in response to selection of email portal 214, center pane 204 may display a user's email messages. In some aspects, as illustrated by FIG. 2E, a user's email messages may be organized based on conversations 252 between one or more users. For example, as shown in left rail 202, a conversation 252a between a first user and a second user (e.g., Rachel) may be displayed separately from a conversation 252b between the first user, a third user (e.g., Rob) and fourth user (e.g., Sofia).

In aspects, by selecting a conversation 252 displayed in the left rail 202, communications between the one or more users may be displayed in center pane 204. As illustrated in FIG. 2E, conversation 252c has been selected and the communications 254 between the first user and the second user (e.g., Rachel), the third user (e.g., Rob), a fifth user (e.g., Jim), and a sixth user (e.g., Sophia) are displayed in center pane 204. In this example, the first user refers to the accessing user (e.g., Ping Li) identified by user name 256a and user icon 256b.

In aspects, communications 254 of conversation 252c may be displayed in descending order based on a date each communication 254 was received with the most recent communication 254 displayed at the top of center pane 204. In other aspects, communications 254 of conversation 252c may be displayed in ascending order based on a date each communication 254 was received with the most recent communication 254 displayed at the bottom of center pane 204.

In further aspects, information related to conversation 252c may be organized by tabs or pages. For example, each tab 258 may display a different type of information associated with conversation 252c in the center pane 204. When selected, a tab 258 may be identified by highlighting, with a different font or font color, by outlining, underlining, and the like. As illustrated by FIG. 2E, a first tab (e.g., conversation tab 258a) may display the communications 254 between the first user, second user, third user, fifth user and sixth user. Additional tabs, described in further detail above, may include a second tab (e.g., files tab 258b), a third tab (e.g., links tab 258c), a fourth tab (e.g., lists tab 258d), and the like, for displaying files, links, lists, etc., shared between participants in the conversation 252c. For example, as illustrated by FIG. 2E, a list object 260 was inserted in communication 254a from the second user (e.g., Rachel). In aspects, as described above, the list object 260 may be accessed from the conversation tab 258a or from the lists tab 258d.

As illustrated by FIG. 2E, when viewing a conversation 252c between the first user, second user, third user, fifth user and sixth user, the right rail 206 may display information associated with the conversation 252c and/or the users participating in the conversation 252c. For example, the right rail 206 may display group availability 282 for the users participating in the conversation 252c. The right rail 206 may further display common meetings 284 between the users participating in the conversation 252c. In aspects, any information related to conversation 252c and/or the participating users may be displayed in right rail 206.

As should be appreciated, the various features and functionalities of user interface 200 described with respect to FIG. 2E are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2F:
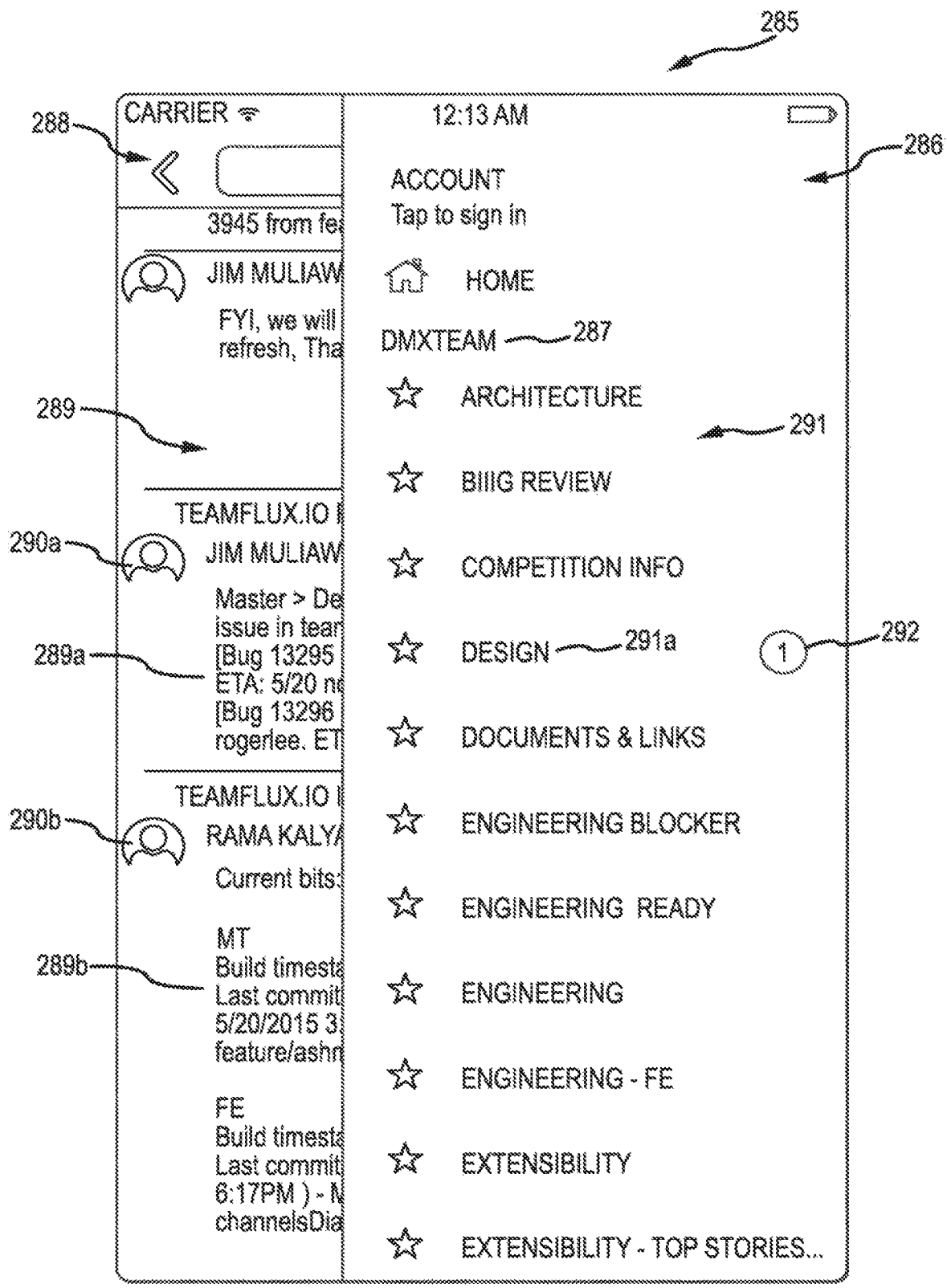
FIG. 2F illustrates an exemplary mobile interface for interacting with the unified messaging platform, according to an example embodiment.

FIG. 2F illustrates an exemplary mobile interface for interacting with the unified messaging platform, according to an example embodiment.

In aspects, a version of the unified messaging platform may provide a user interface 285 for mobile devices. The mobile user interface 285 may provide one or more panes or windows for viewing communications, files, lists, links, etc., associated with one or more teams of which a user is a member. In some aspects, a second pane may be displayed (e.g., second pane 288) in response to swiping a first pane (e.g., first pane 286) in a left-to-right direction or a right-to-left direction.

As illustrated, first pane 286 displays one or more teams (e.g., team 287) and one or more categories (e.g., categories 291). In aspects, a notification (e.g., notification 292) may be displayed near a category (e.g., category 291a) when a new communication, file, list, hyperlink, etc., has been received within the category 291. As further illustrated, second pane 288 displays one or more communications 289 (e.g., communications 289a and 289b), which are each associated with a sender (e.g., senders 290a and 290b).

As should be appreciated, the various features and functionalities of user interface 285 described with respect to FIG. 2F are not intended to limit associated systems and methods to the particular features and functionalities described. Accordingly, additional features and functionalities may be associated with the systems and methods described herein and/or some features and functionalities described may be excluded without departing from the systems and methods described herein.

Figure 2G:
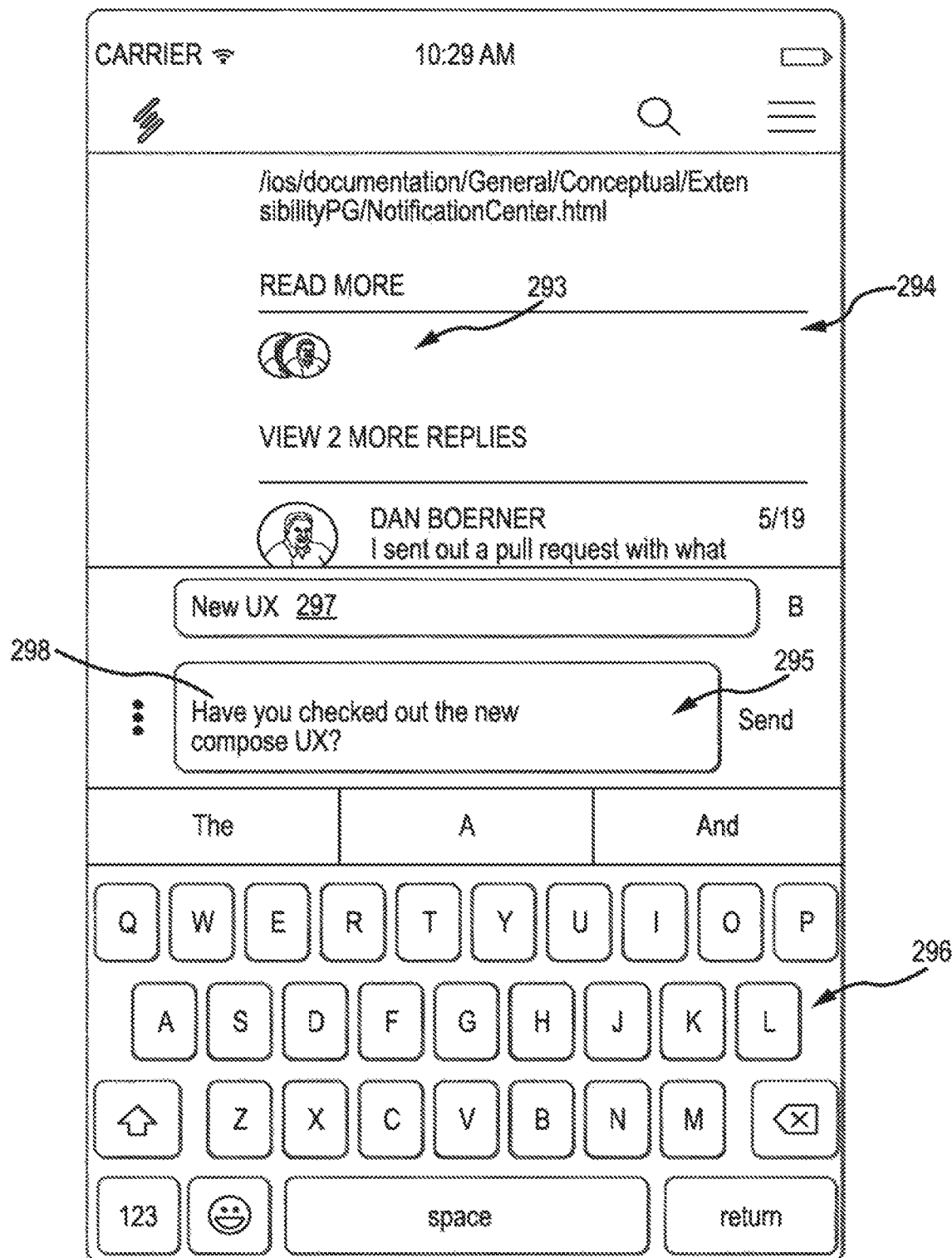
FIG. 2G illustrates an exemplary mobile interface for interacting with the unified messaging platform, according to a second example embodiment.

FIG. 2G illustrates an exemplary mobile interface for interacting with the unified messaging platform, according to a second example embodiment.

As described above, mobile user interface 285 may allow a user to view a conversation (e.g., conversation 293) in a conversation pane (e.g., conversation pane 294). The mobile user interface 285 may further provide a new message input field 295 and an input interface 296 for inputting and sending communications to participants of the conversation 293. In aspects, when a communication is sent to the participants of an ongoing conversation (e.g., conversation 293), new message input field 295 does not require recipient information but may provide a subject input field, e.g., subject input field 297, for inputting a subject of the communication, e.g., "New UX." In some aspects, new message input field 295 may be similar to an instant, chat, SMS, or similar messaging interface. In other aspects, new message input field 295 may provide functionality similar to an email messaging interface (e.g., allowing for attaching documents, list objects, images, etc.). As illustrated, a communication 298 has been partially input into new message input field 295.

As should be appreciated, the various features and functionalities of user interface 285 described with respect to FIG. 2G are not intended to limit associated systems and methods to the particular features and functionalities described. Accordingly, additional features and functionalities may be associated with the systems and methods described herein and/or some features and functionalities described may be excluded without departing from the systems and methods described herein.

Figure 3:
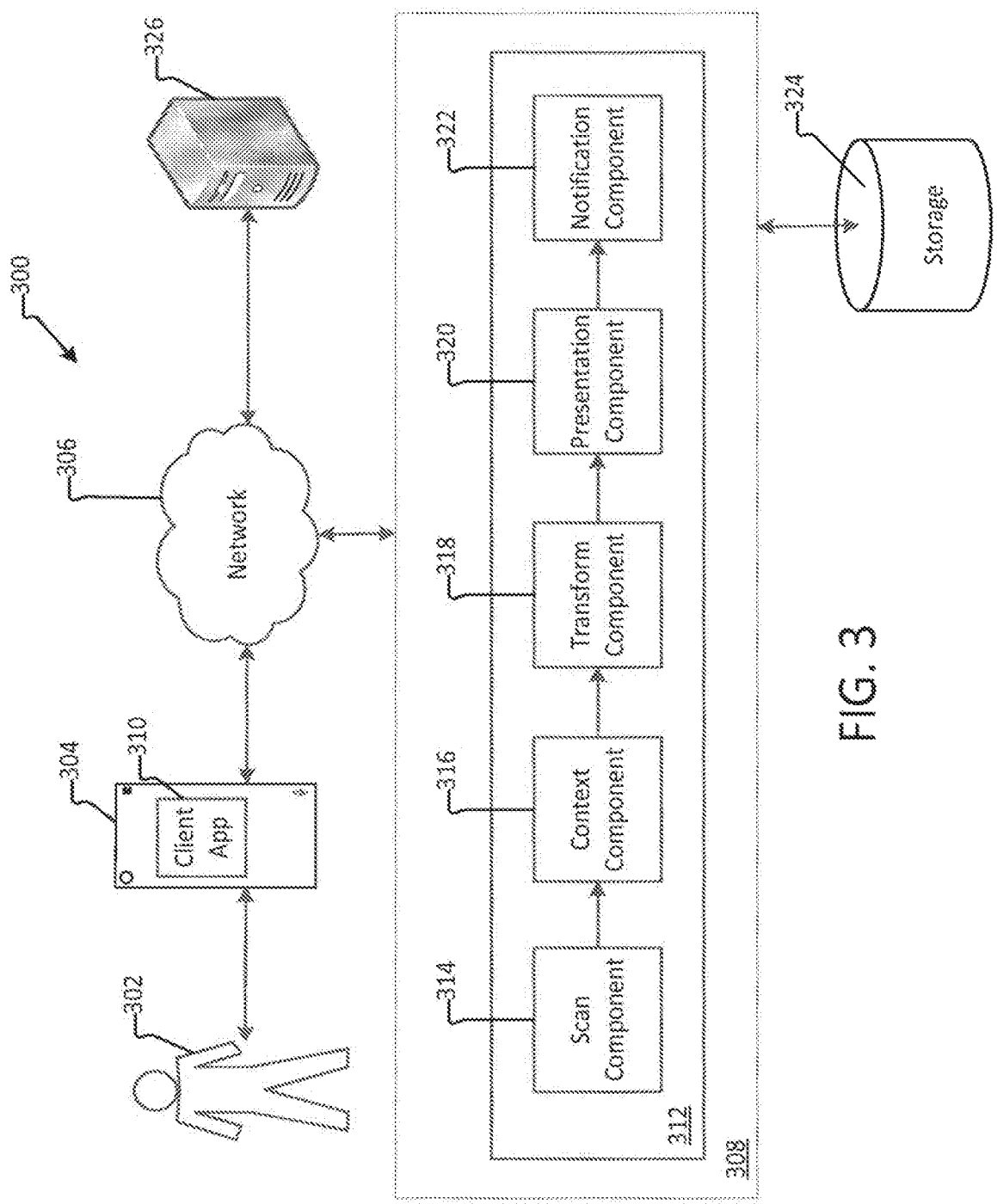
FIG. 3 illustrates an exemplary system implemented on a computing device for message handling, according to an example embodiment.

FIG. 3 illustrates an exemplary system implemented on a computing device for message handling, according to an example embodiment.

In aspects, a client computing device 304 may implement a unified messaging application. In some aspects, client computing device 304 may implement a client application 310 for interfacing with unified messaging application 312 implemented on a server computing device 308. In a basic configuration, the client computing device 304 may be described similarly to client computing device 104. However, any suitable client computing device for implementing a unified messaging application 312, or client application 310 of such application, may be utilized.

In aspects, as illustrated in FIG. 3, the unified messaging application 312 may be implemented on a server computing device 308. In a basic configuration, the server computing device 308 may be described similarly to server computing device 106. The server computing device 308 may provide data to and from the client computing device 304 through a network 306, where network 306 is described similarly to network 108. In further aspects, the unified messaging application 312 may be implemented on more than one server computing device 308, such as a plurality of server computing devices 308. As discussed above, the server computing device 308 may provide data to and from the client computing device 304 through the network 306. In some cases, a textual or voice input may be received at the client computing device 304 and transmitted over the network 306 for processing by unified messaging application 312 at the server computing device 308.

As illustrated in FIG. 3, the unified messaging application 312 may include a scan component 314, a context component 316, a transform component 318, a presentation component 320 and a notification component 322. The various components may be implemented using hardware, software, or a combination of hardware and software. The unified messaging application 312 may be configured to receive and process textual and/or voice input messages. In one example, a textual and/or voice input may include phrases, words, and/or terms in the form of a textual and/or spoken language input (e.g., a user text or voice message). In this regard, the unified messaging application 312 may be configured to receive the textual and/or spoken language input from user 302. In aspects, the unified messaging application 312 may be configured to convert spoken language input into a textual communication between team members. For example, the unified messaging application 312 may include standard speech recognition techniques known to those skilled in the art such as "automatic speech recognition" (ASR), "computer speech recognition", and "speech to text" (STT). In some cases, the unified messaging application 312 may include standard text to speech techniques known to those skilled in the art such as "text to speech" (TTS).

As illustrated by FIG. 3, the client computing device 304 and the server computing device 308 may further be in communication with storage 324 that stores various parameters, configuration information, communications, images, documents, list objects, or any other information accessed by unified messaging application 312. Storage 324 may be a local or remote database, within an enterprise intranet, or in distributed locations over the Internet. In aspects, storage 324 may include a plurality of textual files, including formatted, markup or plain text in any file format such as digital word processing documents, spreadsheets, presentations, webpages, text messages, tweets, email messages, and the like.

In aspects, the scan component 314 may scan messages for embedded content, hyperlinks, textual or graphical content, image content, video content, attached documents, command lines, user callouts, and the like. Scan component 314 may implement any suitable technique for scanning messages, including common techniques presently known or techniques developed in the future. Traditionally, a common approach to extract structured data from a document uses a "wrapper" that relies on the structure of the document to extract specific pieces of information. Recent advances in extraction techniques rely on semi-structured information extraction from HTML pages, natural language processing (NLP) techniques such as speech taggers, and semantic tagging and shallow parsing to build relationships between various components within a sentence. These approaches utilize recognizable keywords to identify specific relationships or patterns, e.g., in HTML DOM trees, and are more resilient to changes in the structure of the document. In aspects, any of the techniques described above, or any other technique presently known or developed in the future, may be implemented by scan component 314 to scan messages. In some cases, in response to determining a structure of the content, scan component 314 may assign identifiers to various portions of the structure of content (e.g., a hierarchical structure) and may further anchor content within the structure by any suitable means.

Additionally, context component 316 may evaluate each message for a context. Context refers to any feature, condition or circumstance that is related to the message. For instance, context can relate to a type of client computing device 304 that the message originated from and/or will be routed to, a type of messaging application the message originated from and/or will be routed to, textual queues regarding a user intention, global positioning system (GPS) data associated with the message or its sender, a time of day, a time zone for a sender and/or a recipient of a message, etc. In some cases, in response to determining a context of the message, context component 316 (rather than scan component 314) may assign identifiers to various portions of the structure of content and may further anchor content within the structure by any suitable means.

Additionally, when a receiving application is not the unified messaging application 312 or the client application 310, transform component 318 may transform each message into a format and/or representation understood or readable by the receiving application, e.g., a third party messaging application, an enterprise messaging application, an external services application, a third party website, and the like.

In further aspects, a presentation component 320 may display, render, present, or transmit the message in a format and/or representation understood or readable by unified messaging application 312, a third party messaging application, an enterprise messaging application, an external services application, a third party website, and the like.

Notification component 322 may further notify user 302, or another user, via the unified messaging application 312, a third party email messaging application, an enterprise messaging application, an SMS application, a social networking application, or any other application suitable for making notifications to a user. Such notifications may include notifications that the user was identified in a user callout, that the user received a message, that the user was assigned a task, that a document or file was edited, that a document or file was uploaded, and the like.

According to further aspects, the client computing device 304 and/or server computing device 308 may be in communication with a third party computing device 326. Third party computing device 326 may be described similarly to server computing device 106 or server computing device 308. In aspects, third party computing device 326 may host one or more third party messaging applications, external services, third party websites, etc. In at least some aspects, authentication (e.g., authentication 112) may be required to access third party computing device 326.

As should be appreciated, the various devices, components, etc., described with respect to FIG. 3 are not intended to limit the systems and methods to the particular components described. Accordingly, additional topology configurations may be used to practice the methods and systems herein and/or some components described may be excluded without departing from the methods and systems disclosed herein.

Figure 4:
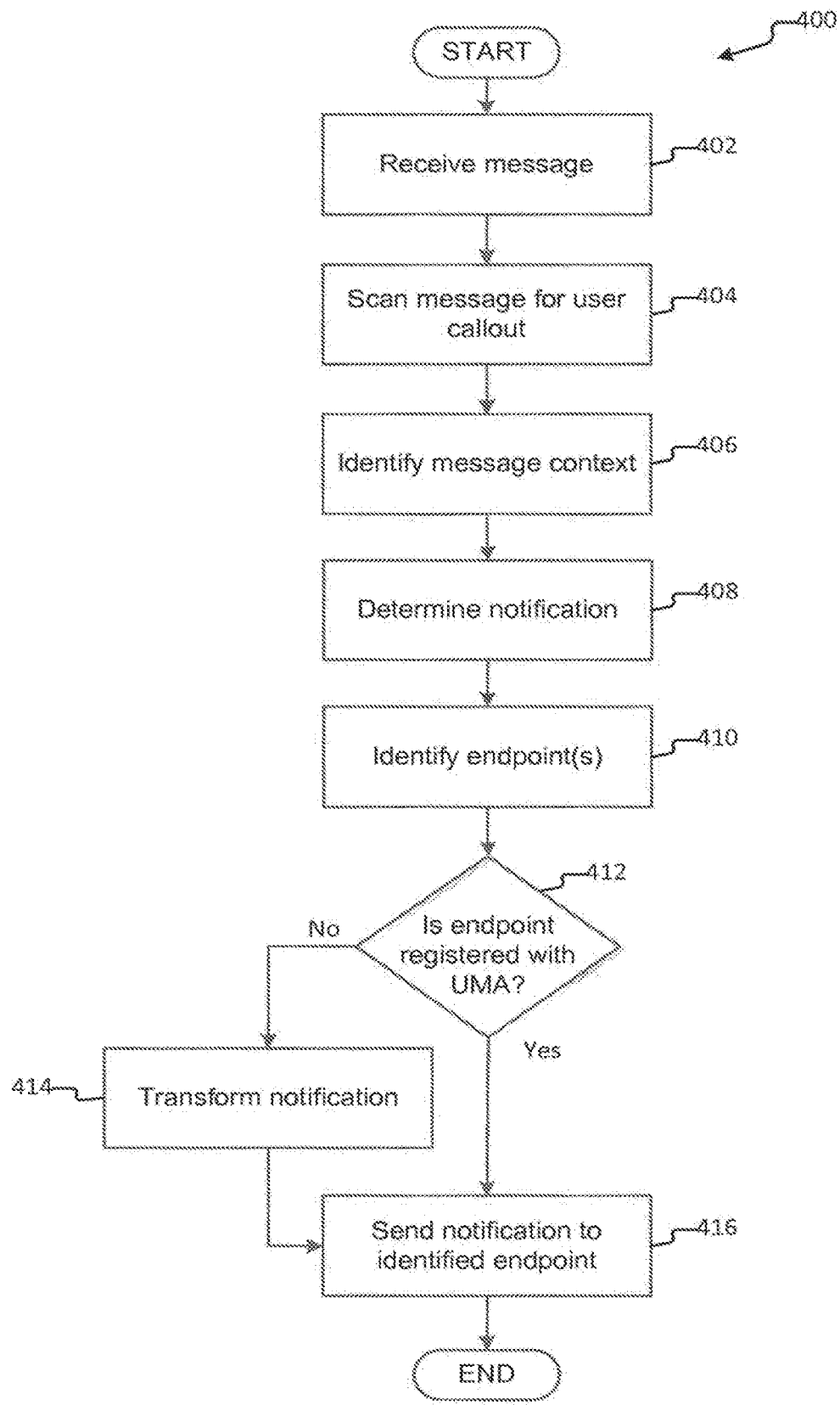
FIG. 4 illustrates an exemplary method for handling a user callout in a message, according to an example embodiment.

FIG. 4 illustrates an exemplary method for handling a user callout in a message, according to an example embodiment.

Method 400 begins with receive operation 402, where a message is received by a unified messaging application. The message may be of any type or format, including an email message, voice message, SMS message, instant message, and the like. As used herein, content of a "body" of the message (e.g., "message body") refers to content of the message exclusive of attachments, metadata, time stamp, date, subject line, recipient field, sender field, signature block, confidentiality disclaimer, etc. Alternatively, content of the "message" refers to all content of the message inclusive of attachments, metadata, time stamp, date, subject line, recipient field, sender field, signature block, confidentiality disclaimer, etc. In some cases, the message may be received from a sender at a second endpoint who is registered with one or more of the unified messaging application, an enterprise messaging application, a third party email messaging application, an SMS messaging application associated with a cellular service plan, an instant messaging application, or otherwise. In other cases, the message may be received as input by an "accessing user" at a first endpoint, where the accessing user inputs content into a new message input field, an email interface object, a message reply input field, etc., associated with the unified messaging application.

At scan operation 404, content of the message or the message body may be scanned. In aspects, the message body may be scanned for textual content, image content, video content, audio content, commands, user callouts, hashtags, hyperlinks, and the like. Alternatively, the message may be scanned for attachments, sender information, recipient information, subject information, time or date stamp information, metadata, and the like. For instance, any suitable technique for scanning messages, including common techniques presently known or techniques developed in the future, may be employed. Structured data may be identified and/or extracted using a "wrapper," semi-structured information such as HTML may be identified and/or extracted, natural language processing (NLP) techniques may be used to build relationships between various components within textual content, image and/or video detection techniques may be used, etc. By way of further example, scan operation may identify certain words, phrases, characters and/or symbols within the textual content of a message that correspond to or are associated with operations, commands, actions, or are otherwise understood by the unified messaging application.

In some cases, particular characters, symbols, or combinations thereof, within textual content of a message may be recognized by scan operation, e.g., @, @!, #, ##, /, //, !, !!, *, and the like. For instance, an "@" symbol as the first character of a word may indicate a user callout, a "/" symbol as the first character of a word may indicate a command line, a "//" symbol within or as the first character of a word may indicate a hyperlink, a "#" symbol as the first character of a word may indicate a hashtag, etc. In particular, an "@" symbol followed by a user identifier may correspond to a user callout, e.g., @Tom, @tom.gmail.com, @TomKent, etc. Additionally, a user callout may be recognized when a user identifier is added to a task list object (e.g., task user callout), or when a user identifier is added to a semantic object, such as an expense report approval object, a voting object, etc. (e.g., an approval user callout, a vote user callout, etc.). In additional aspects, an urgent user callout may be recognized based on identification of multiple symbols followed by a user identifier, e.g., a combination of "@!" or "!@" symbols, or based on other indicators of urgency, e.g., "high importance" flag.

At identify context operation 406, a context associated with the message may be identified. For example, identifying context may include identifying presence of a user associated with a user callout (e.g., whether the user is a participant in a conversation associated with the message, whether the user is active or inactive on an endpoint, and the like); identifying a location of an endpoint for a sender of the message, a recipient of the message, and/or a user associated with a user callout; identifying whether a message is urgent or not; identifying whether the message is a communication within a conversation thread; and the like.

At determine notification operation 408, a notification type may be determined based on one or more factors. For instance, the notification type may be determined based on message content, message context and/or a type of user callout (e.g., a vote user callout, an approve user callout, an invite user callout, a urgent user callout, etc.). In aspects, determining a notification type may determine handling for the notification.

For example, if message content and/or message context indicates urgency (e.g., @Tom, I need the financials STAT for the meeting in 10 min!), or if an urgent user callout is recognized (e.g., @!Tom, @Tom!, and the like), an urgent notification may be determined. In aspects, an urgent notification may comprise a notification sent to a plurality of endpoints associated with the user, a notification sent to a plurality of messaging applications associated with the user (e.g., an enterprise messaging application, a third party email messaging application, an SMS or text application, an instant messaging or chat application, a social networking application, or any combination thereof, etc.), a notification that "light ups" a user interface or display (e.g., by powering on the display, by causing the display to flash, by causing a red display background, and the like), and/or a notification that includes audio or other alert, and the like.

Alternatively, a task user callout may be determined when a user identifier has been added to a task list object. For a task user callout, a notification may be sent to one or more messaging applications associated with the user (e.g., an enterprise messaging application, a third party email messaging application, an SMS or text application, an instant messaging or chat application, a social networking application, or any combination thereof, etc.), the notification may be sent to one or more task or calendaring applications associated with the user, the notification may cause the task to be added to a user's task list and/or calendar, and the like.

In other aspects, determine notification operation 408 may determine content of a notification based on one or more factors. In some cases, the content of the notification may simply include a notice that the user was mentioned in a conversation. In this case, the content of a simple notification may merely include textual content (e.g., the notice). On the other hand, the content of a complex notification may include textual content (e.g., notice) along with additional data related to the message (e.g., controls, links, code, images, etc.). For instance, the additional data may include controls for performing an activity (e.g., approving, rejecting, voting, etc.), links to other applications or content (e.g., a link to a LOB website, a link to a CRM website, a link to a conversation thread, etc.), code for performing an action (e.g., code for adding a task to a user's task list and/or calendar; code for causing behaviors on an endpoint such as lighting up a user interface, triggering audio alerts, triggering visual alerts, etc.), images (e.g., static reproductions of communications, static reproductions of list or semantic objects which are not compatible with an endpoint, etc.), and the like.

By way of a first example, e.g., for an approval user callout, the content of the notification may include a notice indicating that the user's approval for an item (e.g., an expense report, financial report, work order, change order, and the like) is requested, and may further include one or more controls for acting on the item (e.g., for approving, rejecting, reviewing details, and the like). In a second example, e.g., for a task user callout, the content of the notification may include a notice indicating that the user has been assigned a task, and may further include controls or links for updating a status of the task, may include controls or links for manually adding the task to the user's task list and/or calendar, may include code for automatically adding the task to the user's task list and/or calendar, and the like.

In a third example, e.g., for a user callout within a message that is a communication within a conversation thread, the content of a first notification may include a notice indicating that the user has been added or invited to a conversation thread, and may further include a link or other access to the conversation thread, may include reproductions of one or more communications within the conversation thread, and/or may act to forward the conversation thread to the user. Moreover, a second notification may be determined for other users participating in the communication thread. For instance, content of the second notification may include a notice indicating that the user has been invited to the conversation thread, a notice that communications of the conversation thread have been provided to the user, and/or a notice that the conversation thread has been forwarded to the user.

For any of the above examples, e.g., when the notification is an urgent notification, the content of the notification may further include code for handling the notification, for causing a receiving application to perform actions, and/or for causing behaviors on the identified endpoint. For instance, code may be included that indicates the urgent notification should be transmitted to all active endpoints identified for a user. In this case, while a rule or policy may dictate that notifications should be transmitted to higher priority endpoints identified for a user, the code may override the rule or policy such that the urgent notification is transmitted to all active endpoints identified for a user. In additional or alternative examples, code may be included that causes a receiving application to perform certain actions, e.g., promoting the receiving application from background execution to foreground execution, displaying an instant notification on the user interface, etc. By way of further example, code may be included that causes certain behaviors on the identified endpoint, e.g., causes the endpoint to trigger an audio or visual alert, causes the endpoint to power up a display, causes a user interface on the endpoint to display a red background or to flash, and the like. As should be appreciated, the above examples are not intended to be limiting and the content of a notification other than an urgent notification may include code for handling the notification, for causing a receiving application to perform actions, and/or for causing behaviors on the identified endpoint.

At identify endpoint operation 410, an endpoint may be identified for a user associated with a user callout. In some cases, multiple endpoints may be identified for a user, e.g., a personal computer, a mobile device, a tablet, a smart television, etc. Identifying an endpoint may include identifying a device type for the endpoint (e.g., mobile device, personal computer, tablet computer, etc.), a display type for the endpoint (e.g., monitor, television, touch enabled display, graphical display, alphanumeric display, etc.), network access available to the endpoint (e.g., access to a wide area network (WAN), a local area network (LAN), a virtual private network (VPN), and the like, via cellular, wired, wireless, Wi-Fi, or other technology), a state of the endpoint (e.g., powered on, active, inactive, locked, sleeping, powered off, etc.), applications registered for the endpoint (e.g., enterprise or third party email messaging applications, SMS messaging applications, social networking applications, instant messaging applications, voicemail applications, calendaring applications, etc.), and the like. As should be appreciated, one or more combinations of device type, display type, network availability, registered applications, and state may be identified for an endpoint at any given time.

As used herein, an application executing in the foreground may be currently open and interacted with on an endpoint, whereas an application executing in the background may not be currently interacted with on the endpoint but may be capable of receiving, presenting, and/or transmitting data.

For instance, identify endpoint operation 410 may determine that a first endpoint is a mobile device, such as a "smart phone" with a graphical, touch-enabled display. At a first point in time, the first endpoint may have access to one or more networks via cellular and/or wireless means, and may be in an active state (e.g., powered on and recently utilized by a user). Alternatively, at a second point in time, the first endpoint may have access to one or more networks using a cellular technology and may be in an inactive state (e.g., powered on but not recently utilized by a user). At a third point in time, the first endpoint may be "powered off."

In another example, a second endpoint may be a mobile device with an alphanumeric display that is capable of receiving phone calls and text-type messages via cellular technology but may not have access to a WAN, such as the Internet, via cellular technology. The second endpoint may further be registered with an SMS application and a voicemail application and may be in an inactive state (e.g., powered on but not recently utilized by a user).

In further aspects, a third endpoint may be a tablet with a graphical, touch-enabled display that is running a gaming application in the foreground and a unified messaging application in the background. The third endpoint may be connected to a wireless LAN but may not have cellular access to a network, and the third endpoint may be powered on but in an inactive and locked state (e.g., not recently utilized by a user and requiring authentication for activation).

In still further aspects, a fourth endpoint may be a personal computer coupled to a display monitor that is registered with an enterprise messaging application, a third party email messaging application, a social networking application, and a calendaring application. The fourth endpoint may further have access to a private LAN (e.g., enterprise intranet) via a wired connection. The fourth endpoint may be powered on but may be in an inactive, locked, and sleep state (e.g., not recently utilized by a user, requiring authentication for activation, and powered down such that the display monitor is turned off). As noted above, identifying the endpoint may also involve identifying different combinations at different times of device type, display type, network access, registered applications, state, etc.

At decision operation 412, it is determined whether the endpoint is registered with the unified messaging application (UMA). In aspects, whereas the user callout may have been received at an endpoint registered with the unified messaging application, a user identified by the user callout may be associated with one or more endpoints that are not registered with the unified messaging application (e.g., the user identified by the user callout may be an external user). If an endpoint is registered with the unified messaging application, the method proceeds to send notification operation 416. Alternatively, if an endpoint is not registered with the unified messaging application, the method proceeds to transform operation 414.

At transform operation 414, the determined notification is transformed such that it is readable and/or renderable by one or more applications registered with the one or more identified endpoints. In aspects, for applications other than the unified messaging application, content of a notification may be altered (i.e., transformed) such that it can be provided to a team member who is not registered with the unified messaging application. That is, transforming a notification may include translating the notification into a representation readable by a receiving application and may also include reformatting the notification into a structure renderable by a receiving application and/or an identified endpoint. Thus, transforming the notification may be described in terms of a translation process (e.g., such that the notification is in a language or format readable or understandable by a consuming application) and a reformatting process (e.g., structuring the content of the notification such that it may be rendered or presented by a consuming application or by a particular endpoint). In some aspects, the transform operation may involve a single process that transforms the notification into a language or format readable by a receiving application, where the receiving application performs any processing necessary for rendering or presenting the notification on a particular endpoint.

In some aspects, the notification may be transformed differently for different applications registered with different endpoints. For instance, the notification may be transformed based on one or more factors associated with an identified endpoint, including a device type, display type, network access, registered applications, state, etc. That is, if the receiving application is an email messaging application, the notification may be reformatted into an "email-like" structure having a recipient address, subject line and message body. Additionally, the email-like message may be translated into a first representation readable by an enterprise messaging application and into a second representation readable by a third party email messaging application. Alternatively, if the receiving application is an instant messaging application or a social networking application, the notification may be reformatted into a "chat-like" structure without a subject line. The chat-type message may further be translated into a first representation readable by the instant messaging application and into a second representation readable by the social networking application. Similarly, if the receiving application is an SMS application, the notification may be reformatted into a "text-like" structure without a subject line. Moreover, the text-type message may be translated into a representation readable by the SMS application and compatible with a cellular network associated with the identified endpoint. In some cases, e.g., for text-like and chat-like messages, depending on the capabilities of a receiving application, textual content (e.g., a notice) of a notification may be transformed, but additional data (e.g., controls) of the notification may not be transformed or transmitted with the text-like or chat-like message.

Furthermore, as introduced above, transform operation may be based on additional factors, such as a device type and display type. For instance, while transform operation may include reformatting a notification into a structure renderable by a receiving application, transform operation may also include reformatting the notification into a structure renderable by a particular device type having a particular display type. For instance, while a personal computer may be capable of rendering a dynamic list object within a notification, a mobile device may not have such capability. In this case, transform operation may reformat the dynamic list object as a static image for rendering by the mobile device. Additionally or alternatively, while with a first mobile device with a touch-enabled graphical display may be capable of rendering a table object or image within a notification, a second mobile device with an alphanumeric display may merely be capable of rendering a short string of textual content. In this case, transform operation may translate and/or reformat the notification with the textual content and the table object or image for transmission to the first mobile device. However, transform operation may translate and/or reformat the textual content for transmission of the notification to the second mobile device, but may decline to transform or include the table object or image with the notification.

In some cases, a notification may be transformed for transmission to more than one messaging application (e.g., a third party email messaging application, an SMS application, and an instant messaging application) registered with an identified endpoint. In some cases, e.g., for an urgent notification, the notification may be transformed for transmission to a plurality of messaging applications registered with an identified endpoint. Alternatively, a notification may be transformed for transmission to a subset of the messaging applications registered with an identified endpoint. That is, messaging applications may be prioritized such that the notification is transformed for transmission to higher priority messaging applications but not transformed for transmission to lower priority messaging applications. Messaging applications may be prioritized in any suitable manner and the priorities of messaging applications may change at different times and under different circumstances. For instance, where such information is available, messaging applications that are open or executing on an endpoint may take priority over messaging applications that are not open or executing, messaging applications executing in the foreground may take priority over messaging applications executing in the background, messaging applications capable of providing instant notifications to a user interface may take priority over messaging applications without this capability, messaging applications that are accessed more often by a user may take priority over messaging applications that are accessed less often, an enterprise messaging application may take priority over a third party email messaging application during work hours, etc. In aspects, processing resources may be conserved and efficiency may be increased by transforming the notification for transmission to messaging applications that are most likely to convey the notification to a user.

Additionally or alternatively, a notification may be transformed for transmission to applications registered with multiple endpoints associated with a user. For example, the notification may be transformed for transmission to an enterprise messaging application registered with a first identified endpoint (e.g., a personal computer) and may be transformed for transmission to an SMS application registered with a second identified endpoint (e.g., a mobile device). Additionally, the identified endpoints may be prioritized such that the notification is transformed for transmission to one or more applications registered with higher priority endpoints but not transformed for transmission to one or more applications registered with lower priority endpoints. Endpoints may be prioritized in any suitable manner and the prioritization of endpoints may change at different times and under different circumstances. For instance, a mobile device may take priority over a personal computer at a first time of day, but a personal computer may take priority over a mobile device at a second time of day. Moreover, where such information is available, an endpoint in an active state may take priority over an endpoint in an inactive state, an endpoint having access to a network may take priority over an endpoint not having access to a network, etc. In aspects, processing resources may be conserved and efficiency may be increased by transforming the notification for transmission to applications registered with endpoints that are most likely to convey the notification to a user. Accordingly, transform operation may be performed in response to evaluating a prioritization of applications, a prioritization of identified endpoints, or some combination thereof, and transform operation may be performed differently at different times and under different circumstances.

In the ensuing examples, a simple notification may include a notice indicating that the user was mentioned in a conversation, whereas a complex notification may include the notice indicating that the user was mentioned in a conversation along with additional data or information (e.g., controls, attachments, images, code, etc.). In the case of a simple notification, the notice may comprise textual content and the transform operation may involve translating the textual content into a representation and/or reformatting the textual content into a structure such that the notice is readable and/or renderable by a receiving application registered with the identified endpoint. For example, where a third party email messaging application is the receiving application, the textual content may be reformatted into an email type structure and may be translated into a plain text representation, an HTML representation, or other representation readable by the third party email messaging application. Alternatively, where an enterprise messaging application is the receiving application, the textual content may be reformatted into an email type structure and may be translated into a rich text representation, a plain text representation, an HTML representation, or other representation readable by the enterprise messaging application. In some cases, to conserve processing resources, where receiving applications include both a third party email messaging application and an enterprise messaging application, the textual content may be translated into a representation readable by both messaging applications, e.g., a plain text representation. Alternatively still, where an SMS application is the receiving application, the textual content may be reformatted into a structure (e.g., text-type structure) and translated into a representation compatible with various transfer protocols (e.g., short message transfer protocol (SM-TP), protocol data unit type (PDUT)), and for various types of mobile networks (e.g., global system for mobile communications (GSM), code division multiple access (CDMA)).

In the case of a complex notification, e.g., an approval user callout, the content of the notification may include a notice indicating that the user's approval for an item is requested (e.g., textual content), and may optionally include one or more controls for acting on the item (e.g., for approving, rejecting, reviewing details, and the like). In this case, the transform operation may involve transforming the textual content and the controls for transmission to a receiving application registered with the identified endpoint. That is, the transform operation may reformat the textual content into a structure (e.g., email-like message structure, text-like message structure, etc.) and the controls into a structure (e.g., button, link, etc.) and may translate the textual content and the controls into a representation such that the notification is renderable and/or readable by the receiving application and/or the identified endpoint. For instance, the transform operation may reformat the control into a first structure (e.g., button) and translate the control into a first representation renderable and/or readable by a first application registered with a first endpoint. Alternatively, the transform operation may reformat the control into a second structure (e.g., link) and translate the control into a second representation renderable and/or readable by a second application registered with the first endpoint or with a second endpoint. Alternatively still, for a third application having lower capabilities, the transform operation may not reformat or translate the control, but may only transform the textual content into a third structure and/or third representation such that the notification is renderable and/or readable by the third application registered with the first endpoint or other endpoint.

In a further example of a complex notification (e.g., when the message is a communication within a conversation thread), the content of the notification may include a notice indicating that the user has been added or invited to a conversation thread (e.g., textual content), and may further include a link or other access to the conversation thread, may include reproductions of one or more communications within the conversation thread, and/or may forward the conversation thread to the user. In a first aspect, as described with reference to the approval user callout above, the transform operation may reformat and/or translate the textual content and a link to the conversation thread such that the notification is renderable and/or readable by a first receiving application (e.g., messaging application) registered with the identified endpoint. In a second aspect, however, depending on the capabilities of a receiving application, the one or more communications may be provided within textual content of the notification rather than by a link. For instance, e.g., for an enterprise messaging application, the textual content of the notification may be reformatted into an email-like message structure that includes a thread of communications related to the message; alternatively, the textual content of the notification may be reformatted into an email-like message structure and a reproduction of the thread of communications may be provided as an attachment to the email-like message structure. In third aspect, e.g., for an SMS application, the textual content of the notification may be reformatted into a text-type message structure and the thread of communications may be provided as an image or not provided at all.

With respect to the above-described examples for simple notifications and complex notifications, the content of the notification may further include additional features or code for handling the notification, for causing a receiving application to perform actions, and/or for causing behaviors on the identified endpoint (e.g., as described for an urgent notification). In some cases, the code may be translated into a representation readable by a receiving application registered with the identified endpoint. For example, code causing a receiving application to be promoted from background execution to foreground execution may be translated into a representation readable by an enterprise messaging application such that the enterprise messaging application is opened within the user interface and the notification is displayed on the identified endpoint. Alternatively, code causing a receiving application to display an instant notification may be translated into a representation readable by a social networking application such that at least a portion of the notification is viewable on a display associated with the identified endpoint. In some aspects, the code causing the receiving application to display the instant notification may override notification settings for the identified endpoint.

In some cases, code causing certain behaviors on the identified endpoint may be translated into a representation readable by a receiving application or an operating system of the identified endpoint. For instance, code for triggering an audio or visual alert upon receipt of the notification may be translated into a representation readable by a receiving application (or the operating system) on a mobile device. Alternatively, code for powering up a display monitor upon receipt of the notification may be translated into a representation readable by a receiving application (or the operating system) on a personal computer. In some cases, the identified endpoint may not be capable of performing the action instructed by the code, e.g., a mobile device with an alphanumeric display may not be capable of displaying a red background or causing the alphanumeric display to flash. In this case, code for performing the action may not be transformed or transmitted with the notification to the mobile device. However, in this case, another means of expressing urgency may be included with the notification, e.g., exclamations may be inserted at the end of the textual content for presentation on the alphanumeric display.

At send notification operation 416, the notification is sent to the user regarding the user callout. In aspects, as described above, a user callout may be recognized in a received message, e.g., a user callout may be recognized when an "@" symbol that is followed by a user identifier (e.g., @Tom, @tom.gmail.com, @TomKent, etc.), or a user callout may be recognized when a user identifier is added to a task list object, or a user callout may be recognized when a user identifier is added to a semantic object (e.g., an approval object, a voting object, etc.). In additional aspects, an urgent user callout may be recognized by any suitable means, e.g., based on a flag added to the message (e.g., "high importance" flag), based on message content (e.g., recognizing exclamation points within the textual content of the message), based on identification of exclamation symbols with the user callout (e.g., a combination of "@!" or "!@" symbols followed by a user identifier, or "@" and "!" symbols surrounding a user identifier), and the like. Furthermore, based on recognizing a user callout, a notification for the user identified by the user callout may be determined, as described above.

In some aspects, e.g., when an endpoint is registered with the unified messaging application, the notification may not require transformation. That is, textual content (e.g., notice) and any additional data (e.g., controls, links, code, images, etc.) may be included with the notification for display on the identified endpoint without need for transformation. The notification may be displayed within the user interface of the unified messaging application at the identified endpoint, e.g., within a conversation thread. In this case, it is unnecessary to reformat the notification into an email-like message structure for a first receiving application, a text-like message structure for a second receiving application, and/or a chat-like message structure for a third receiving application. Rather, the notification may be displayed in a single suitable structure within the user interface of the unified messaging application, the single suitable structure may be selected at least in part based on the content of the notification. For instance, a complex notification that includes additional data such as a controls or links may be presented in an email-like message structure (e.g., with a subject line indicating that approval is requested and/or that a task has been assigned); alternatively, a simple notification that merely includes textual content may be presented in a text-like message structure. Moreover, as the user is registered with the unified messaging application, a user identifier need not be resolved in order to send the notification to the user. Accordingly, upon determining the notification, the notification may be sent to the user at an endpoint registered with the unified messaging application.

On the other hand, when an identified endpoint is not registered with the unified messaging application, a notification for the user identified by a user callout may be transformed for transmission to one or more receiving application registered with one or more endpoints identified for the user, as described above. Moreover, in order to send the notification to the one or more receiving applications, a user identifier may be resolved. That is, if the receiving application is a third party email messaging application, an email address associated with the third party email messaging application may be resolved for the user. Alternatively, if the receiving application is an SMS application, a phone number associated with the SMS application may be resolved for the user. In some cases, if the user is a team member, contact information including user identifiers associated with various applications may be registered with the unified messaging application. In response to resolving one or more user identifiers, the notification may be sent to one or more receiving applications registered with one or more endpoints identified for the user.

As should be appreciated, operations 402-416 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5:
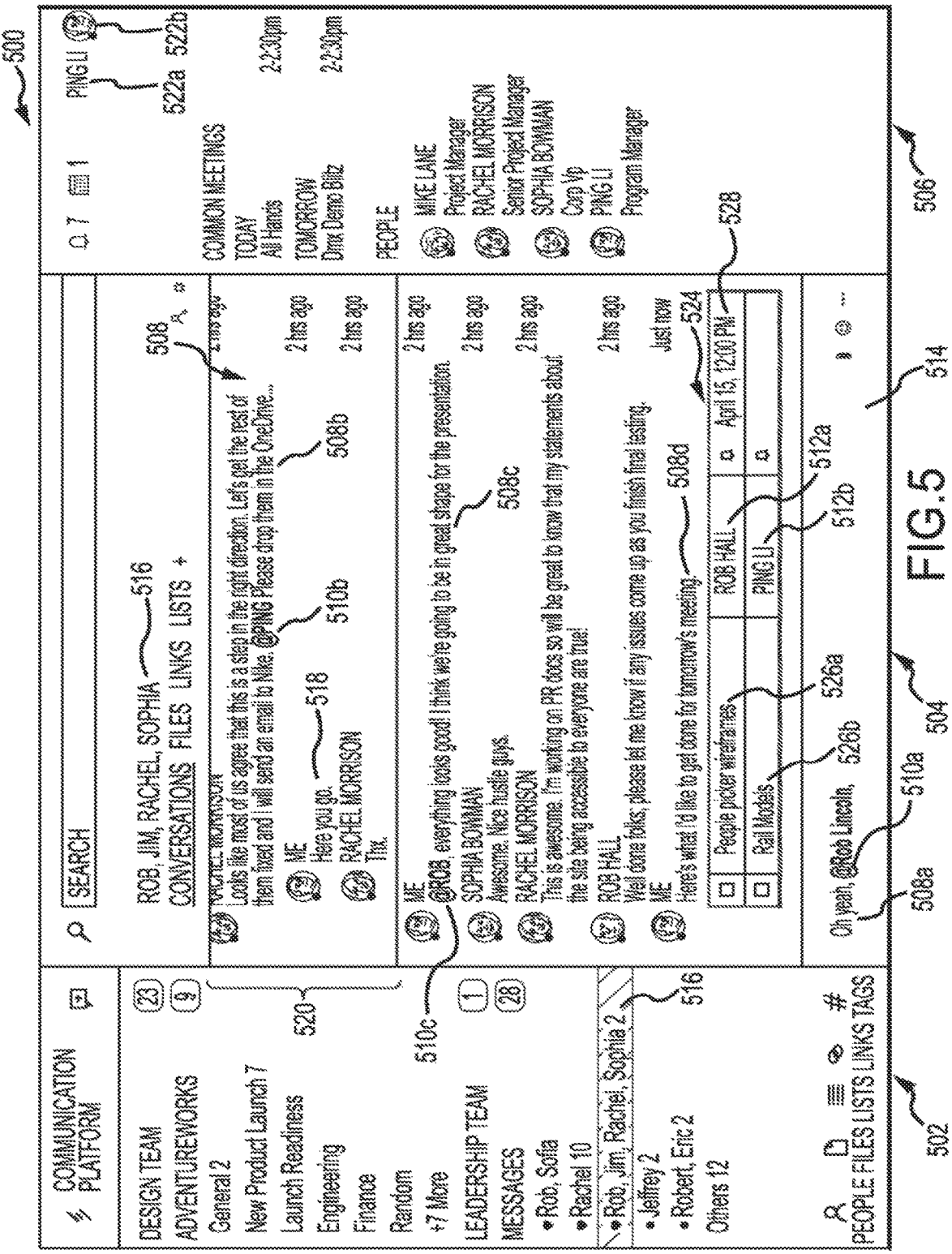
FIG. 5 illustrates an exemplary interface for inserting a user callout in a message, according to an example embodiment.

FIG. 5 illustrates an exemplary interface for inserting a user callout in a message, according to an example embodiment.

As described above, the unified messaging platform may provide a user interface 500 including three panes, e.g., a left rail 502, a center pane 504, and a right rail 506. Additionally, a conversation 516 may be selected in left rail 502 such that one or more communications 508 associated with the conversation 516 are displayed in center pane 504. As illustrated, conversation 516 includes five participants, e.g., a first user ("Ping," accessing user), a second user ("Rob"), a third user ("Jim"), a fourth user ("Rachel"), and a fifth user ("Sophia"). In the illustrated example, the accessing user ("Ping," see, e.g., user identifiers 522a and 522b), may not be identified in a title of conversation 516.

As further described above, the unified messaging platform may provide a new message input field, e.g., new message input field 514, for sending a "text-like" communication. As illustrated, communication 508a has been input into new message input field 514 and the communication 508a includes a user callout 510a. User callout 510a may be recognized by a symbol (e.g., "@") inserted before a user identifier (e.g., "Rob Lincoln"). For user callout 510a, the user identifier includes a first and last name of a user. In response to completing the message and hitting "send" or "enter," communication 508a may become a "received message," as described with respect to FIG. 4.

In another example, a user callout 510b (e.g., "@Ping") was inserted into communication 508b by the fourth user ("Rachel"). For user callout 510b, the user identifier includes a first name but not a last name. In this case, in response to receipt of communication 508b from Rachel (e.g., "received message"), a notification may have been sent to Ping that provided notice of the user callout 510b and Rachel's request for files. In some aspects, the notification may have included code for causing actions to be performed by the unified messaging application and/or for causing behaviors on an endpoint identified for the user. For instance, the notification may have caused the unified messaging application to be promoted from background execution to foreground execution, may have caused the endpoint to trigger an audio or visual alert upon receipt of the notification, may have caused the notification to be displayed in the user interface as an instant notification, may have caused a background of the user interface to be displayed in red, etc. As illustrated, sometime after receipt of the notification, Ping sent a reply communication 518, which is displayed within conversation thread 520 as indented below communication 508b. Similarly, user callout 510c (e.g., "@Rob") was inserted into communication 508c by Ping (e.g., "Me").

In still another example, communication 508d includes a task list object 524. As illustrated, task list object 524 includes a first task 526a (e.g., "People picker wireframes") and a second task 526b (e.g., "Rail Models"). Additionally, task list object 524 includes a first user identifier 512a that indicates a first user (e.g., "Rob Hall") has been assigned to the first task 526a, and a second user identifier 512b that indicates a second user (e.g., "Ping Li") has been assigned to the second task 526b. Moreover, first task 526a includes a deadline 528 (e.g., "April 15, 12:00 PM"). In aspects, in response to entering a user identifier (e.g., first user identifier 526a), into a task list object, a user callout (e.g., a task user callout) to a user (e.g., "Rob Hall") may be recognized. As described above, a notification may be determined for the task user callout which provides notice to the user (e.g., indicating that the user was assigned a task) and may further include a control for adding the task to the user's task list and/or may include code for automatically adding the task to the user's task list. In aspects, where a deadline is provided for a task (e.g., deadline 528), the notification may further include a control and/or code for adding the task to a calendar of the user.

As should be appreciated, the various features and functionalities of user interface 500 described with respect to FIG. 5 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 6:
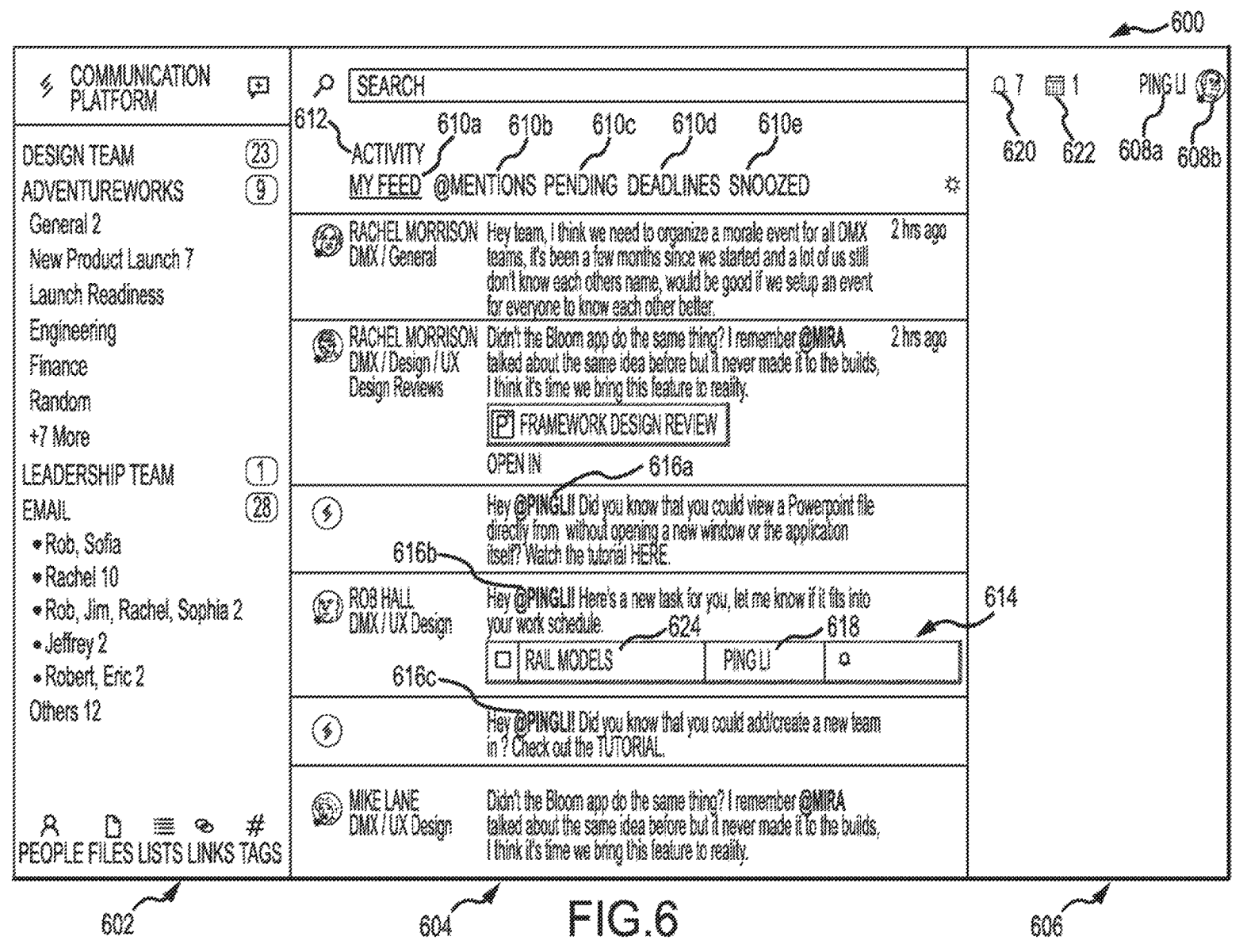

FIG. 6 illustrates an exemplary interface for notifying a user of a user callout in a message, according to an example embodiment. In this case, a user activity feed may provide notifications to a user regarding tasks and/or user callouts in a message.

As described above, the unified messaging platform may provide a user interface 600 including three panes, e.g., a left rail 602, a center pane 604, and a right rail 606. As illustrated, a user's activity 612 may be displayed in center pane 604 in response to selection of tab 610a (e.g., "My Feed," denoted by underlining). For example, among other communications, tab 610a may display communications that include user callouts identifying an accessing user (e.g., "Ping Li," see, e.g., user identifiers 608a and 608b). More specifically, user callouts 616a, 616b, and 616c identify the accessing user, Ping Li, and more specifically, indicate an urgent user callout, (e.g., "@Ping!". Additionally, tab 610a may further display a communication including a task list object 614 that includes a user identifier 618 (e.g., "Ping Li") assigned to task 624. In aspects, activity 612 may display a plurality of user callouts such that the user may be apprised of notifications for tasks and/or actions in one location.

As further illustrated, additional tabs for displaying information associated with activity 612 are provided. For instance, tab 610b (e.g., "@Mentions") may display user callouts identifying the accessing user, tab 610c (e.g., "Pending") may display pending tasks or actions for the accessing user, tab 610d (e.g., "Deadlines") may display deadlines for the accessing user, and tab 610e (e.g., "Snoozed") may display snoozed tasks or actions (e.g., tasks or actions on hold) for the accessing user. Additionally, icons for accessing alerts 620 and/or a calendar 622 may be provided.

As should be appreciated, the various features and functionalities of user interface 600 described with respect to FIG. 6 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 7A:
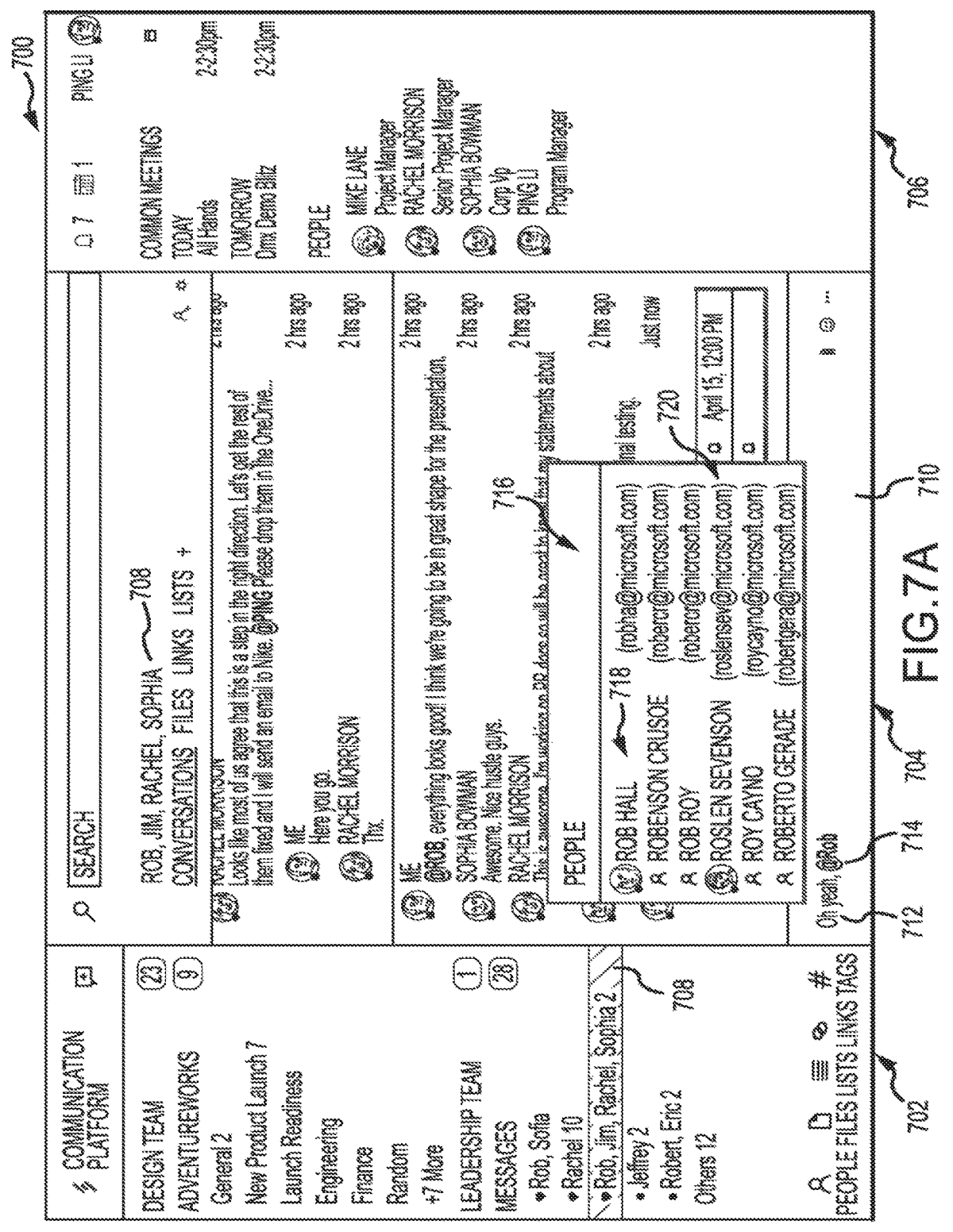

FIG. 7A illustrates an exemplary interface for resolving a user callout for inclusion in a message, according to an example embodiment.

As described above, the unified messaging platform may provide a user interface 700 including three panes, e.g., a left rail 702, a center pane 704, and a right rail 706. For example, a conversation 708 may be selected in left rail 702 and displayed in center pane 704. As further described above, the unified messaging platform may provide a new message input field, e.g., new message input field 710, for sending a "text-like" communication. As illustrated, communication 712 has been partially input into new message input field 710 such that communication 712 includes a portion of a user callout 714 (e.g., "@Ro"). In aspects, upon entering the portion of the user callout 714 into new message input field 710, a window 716 (e.g., pop-up window) may be displayed for resolving the portion of the user callout 714.

For example, window 716 may display one or more user identifiers 718 that match the portion of the user callout 714 (e.g., "Ro"). More specifically, user identifiers 718 begin with the letters "Ro," including "Rob Hall," "Roberson Crusoe," "Rob Roy," "Roslen Sevenson," "Roy Cayno," and "Roberto Gerade." In aspects, upon selection of one of the user identifiers 718, the portion of the user callout 714 may be resolved and a link 720 (e.g., email address) for the selected user may be inserted into the communication 712.

As should be appreciated, the various features and functionalities of user interface 700 described with respect to FIG. 7A are not intended to limit associated systems and methods to the particular features and functionalities described. Accordingly, additional features and functionalities may be associated with the systems and methods described herein and/or some features and functionalities described may be excluded without departing from the systems and methods described herein.

Figure 7B:
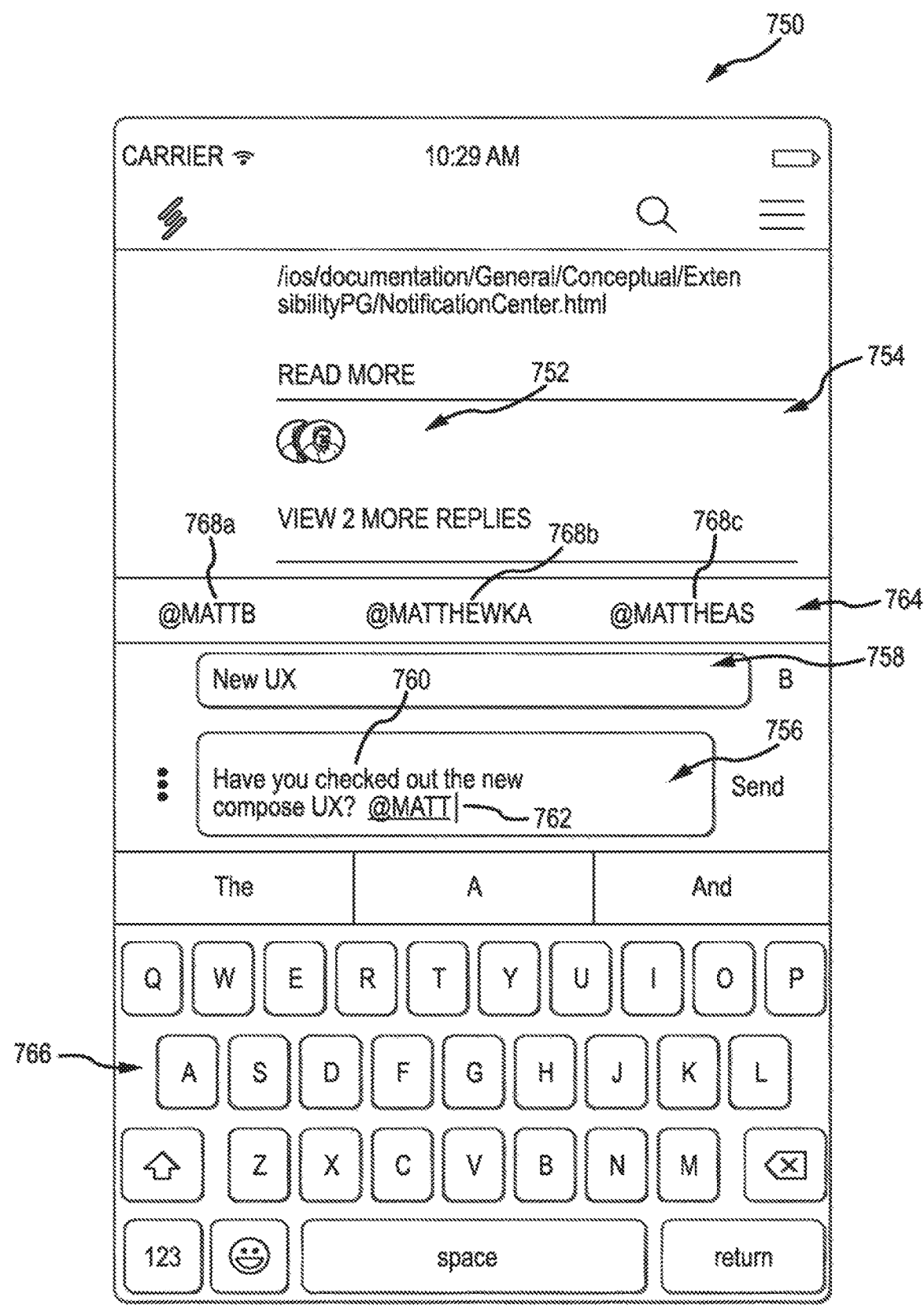
FIG. 7B illustrates an exemplary mobile interface for resolving a user callout for inclusion in a message, according to an example embodiment.

FIG. 7B illustrates an exemplary mobile interface for resolving a user callout for inclusion in a message, according to an example embodiment.

A web version of the unified messaging platform may provide a user interface 750 for mobile devices. In aspects, the mobile user interface 750 may allow a user to view a conversation (e.g., conversation 752) in a conversation pane (e.g., conversation pane 754). The mobile user interface 750 may further provide a new message input field 756 and a input interface 766 for inputting and sending communications to participants of the conversation 752. In aspects, when a communication is sent to the participants of an ongoing conversation (e.g., conversation 752), new message input field 756 does not require recipient information but may provide a subject input field, e.g., subject input field 758, for inputting a subject of the communication, e.g., "New UX." In some aspects, new message input field 756 may be similar to an instant, chat, SMS, or similar messaging interface. In other aspects, new message input field 756 may provide functionality similar to an email messaging interface (e.g., allowing for uploading attachments, etc.).

As illustrated, a communication 760 has been partially input into new message input field 756 such that communication 760 includes a portion of a user callout 762 (e.g., "@Matt"). In aspects, upon entering the portion of the user callout 762 into new message input field 756, a banner 764 may be displayed for resolving the portion of the user callout 762. For example, banner 7 64 may display one or more user identifiers 768*a*-768*c* that match the portion of the user callout 762 (e.g., "@Matt"). More specifically, user identifiers 768*a*-768*c* begin with the symbol-letter combination "@Matt," such as "@MattB," "@MatthewKA," and "@Matteas." In aspects, upon selection of one of the user identifiers 768*a*-768*c*, the portion of the user callout 762 may be completed and a link (e.g., email address, phone number, etc.) for the selected user may be inserted into the communication 760.

As should be appreciated, the various features and functionalities of user interface 750 described with respect to FIG. 7B are not intended to limit associated systems and methods to the particular features and functionalities described. Accordingly, additional features and functionalities may be associated with the systems and methods described herein and/or some features and functionalities described may be excluded without departing from the systems and methods described herein.

Figure 8:
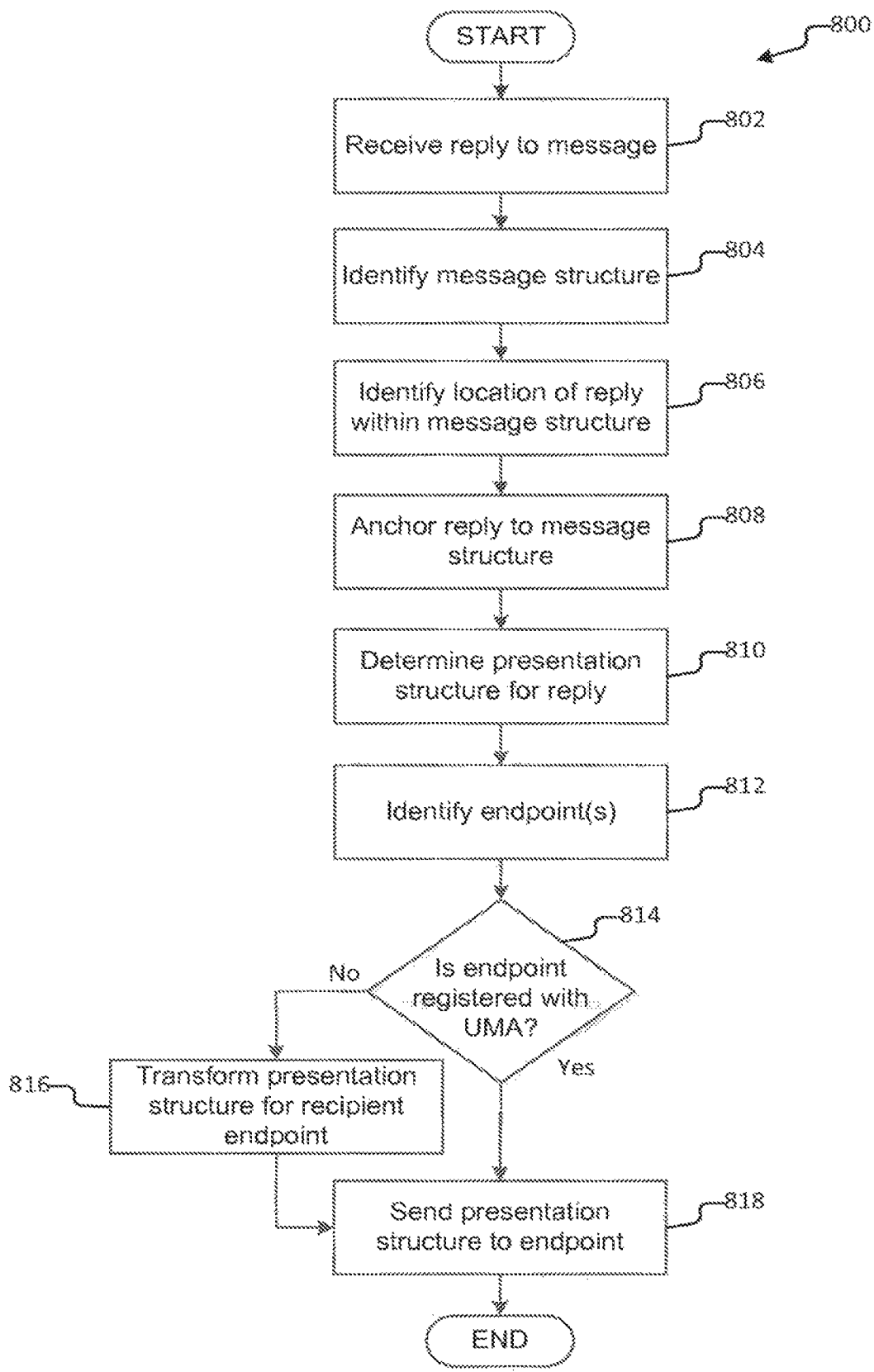
FIG. 8 illustrates an exemplary method for handling an inline reply to a message, according to an example embodiment.

FIG. 8 illustrates an exemplary method for handling an inline reply to a message, according to an example embodiment.

Method 800 begins with receive reply operation 802, where a reply to a message is received. The reply to the message may be of any type or format, including an email message, voice message, SMS message, instant message, and the like. In some cases, the reply to the message may be received from a sender at a second endpoint who is registered with one or more of the unified messaging application, an enterprise messaging application, a third party email messaging application, a cellular service plan including an SMS messaging application, an instant messaging application, or otherwise. In other cases, the reply to the message may be received as input from an "accessing user" of the unified messaging application at a first endpoint, as described above with respect to FIGS. 5-6.

In aspects, a reply to a message may be received upon selection of a reply link (e.g., reply link 234) displayed below a message and entry of the reply into a message reply input field. In other aspects, a reply to a message may be received by hovering over a location within the message or message body or by placing a cursor at a location within the message or message body. As used herein, content of a "body" of the message (e.g., "message body") includes content of the message exclusive of attachments, metadata, time stamp, date, subject line, recipient field, sender field, signature block, confidentiality disclaimer, etc. Alternatively, content of the "message" may include all content associated with the message inclusive of attachments, metadata, time stamp, date, subject line, recipient field, sender field, signature block, confidentiality disclaimer, etc. For example, upon hovering over or placing a cursor at a location with the message body, a user interface may be displayed at or near the location within the message body for inputting a reply message, e.g., a user interface such as a message reply input field. In another example, a user interface may be displayed by hovering over and/or placing a cursor at locations within a message (e.g., subject line, sender field, recipient field, signature block, etc.).

At identify structure operation 804, a structure of the message and/or the message body may be identified. For instance, structured data may be identified using a "wrapper," semi-structured information such as HTML may be identified, natural language processing (NLP) techniques may be used to build relationships between various components within textual content, image and/or video detection techniques may be used, etc. In some cases, e.g., for an email-like message, the message may involve multiple parts (e.g., message body, subject line, recipient field, sender field, attachments, etc.). In other cases, e.g., for a text-like or chat-like message, the message may involve minimal parts (e.g., message body, sender field, time and/or date stamp). In some aspects, a structure for a message may include a hierarchical structure of message parts.

Additionally, identify structure operation 804 may identify a structure for one or more message parts. For instance, identify structure operation 804 may identify a structure of the message body part including, for instance, a sentence structure, a paragraph structure, a bulleted structure, an outline structure, a list structure, and the like. In some cases, one or more elements may be associated with a structure, and each element may be associated with one or more identifiers. For instance, for a sentence structure, the one or more elements may correspond to one or more sentences within the message body, and each sentence may be associated with one or more identifiers, e.g., an identifier associated with the message body part, an identifier associated with the particular sentence, etc. For a bulleted structure, the one or more elements may correspond to one or more bulleted items of text within the message body, and each bulleted item may be associated with one or more identifiers, e.g., an identifier associated with the message body part, an identifier associated with the particular bulleted item, etc.

Further, a paragraph structure may include a hierarchical structure of first elements and second elements. That is, first elements may correspond to one or more paragraphs and second elements may correspond to one or more sentences. In aspects, one or more second elements (e.g., one or more sentences) may fall within each first element (e.g., paragraph), and one or more first elements (e.g., one or more paragraphs) may fall within a message part (e.g., message body part). In this case, each first element (e.g., paragraph) may be associated with multiple identifiers, e.g., an identifier associated with a message part (e.g., message body part), an identifier assigned to the particular first element (e.g., particular paragraph), etc. Additionally, each second element (e.g., sentence) may be associated with multiple identifiers, e.g., an identifier associated with the message body part, an identifier associated with a first element in which the second element falls (e.g., paragraph), an identifier assigned to the particular second element (e.g., particular sentence), etc.

Further still, combinations of structures within a message body are possible. For instance, a message body may include a paragraph structure and a bulleted structure. In this case, the message body may include first elements, second elements, and third elements. As detailed above, one or more second elements (e.g., one or more sentences) may fall within each first element (e.g., paragraph), and one or more first elements (e.g., one or more paragraphs) may be associated with the message body. Additionally, one or more third elements may correspond to one or more bulleted items of text within the message body. In some instances, the one or more bulleted items may further fall within a first element (e.g., paragraph), or may collectively comprise a first element (e.g., paragraph).

For purposes of clarity, in some aspects, the hierarchical structure may be described such that a message may include one or more message parts, each message part may include one or more first elements, each first element may include one or more second elements, and so on. To differentiate between different types of elements (e.g., sentences versus bulleted sentences), in some aspects, a first element may comprise one or more second elements and one or more third elements at a same level of the hierarchical structure. As should be appreciated, the above description of the hierarchical structure of a message is provided for exemplary purposes and is not intended to limit the scope of the disclosure herein, that is, other approaches for describing message structures exist and any suitable description may be employed without departing from the present disclosure.

At identify location operation 806, a location of the reply with respect to the structure of the message and/or message body may be identified. For example, identifying a reply location may include identifying a location within the structure of the message or the message body in which the reply was input. As described above, upon hovering over or placing a cursor at a location within the message or message body, a user interface may be displayed at or near the location within the message or message body for inputting a reply to the message. In aspects, the location at which the reply was input (e.g., reply location) may be associated with a message part (e.g., message body part, subject line part, etc.), one or more elements (e.g., sentence, paragraph, bulleted item, etc.), etc.

For instance, a message body may include a bulleted structure within a paragraph structure. By way of example, the message body part may include four paragraphs, a first paragraph including one sentence (e.g., salutation), a second paragraph including three sentences, a third paragraph comprising four bulleted items, and a fourth paragraph including one sentence (e.g., signature). As described above, the one or more parts and the one or more elements of a message may each be associated with one or more identifiers. For example, in the above example, a third bulleted item may be associated with multiple identifiers, e.g., a first identifier associated with the message body part, a second identifier associated with the third paragraph, and a third identifier associated with the third bullet item. In some aspects, the one or more identifiers that reference the various parts and elements of a message may be stored in a lookup table or other index.

In aspects, upon hovering over the third bulleted item, a message reply input field may be displayed and a reply to the message may be input. In this case, the reply location is at the third bullet item within the third paragraph of the message body part of the message. Identify location operation 806 may identify a message part and one or more elements associated with the reply location. Furthermore, identify location operation 806 may determine one or more identifiers referencing the message part and the one or more elements associated with the reply location. In some cases, identify location operation 806 may reference a lookup table or other index for determining the one or more identifiers. In the above example, the one or more identifiers determined for the reply location may include a first identifier associated with the message body part, a second identifier associated with the third paragraph, and a third identifier associated with the third bullet item. As should be appreciated, the above examples are provided for exemplary purposes and are not intended to limit the scope of the disclosure herein, that is, other methods of identifying and indexing elements within a hierarchical structure are available and any suitable method may be employed without departing from the present disclosure.

At anchor reply operation 808, the reply may be anchored to the reply location within the message. For example, the reply may be associated with the one or more identifiers determined for the reply location, as described above. Alternatively, the reply may be associated with the reply location based on a different approach. According to aspects, any suitable approach for identifying a reply location within a message and associating the reply with the reply location may be employed within the scope of the present disclosure.

At determine presentation operation 810, a structure and content for presenting the reply may be determined. In some instances, presentation of the reply may be determined based on the structure of the message, as detailed above. For instance, the message may comprise a hierarchical structure such that the message includes one or more message parts, which may include one or more first elements, which may include one or more second elements and/or one or more third elements, and so on. More specifically, with reference to the above example, the hierarchical structure of the message may be described such that the message includes a message body part (e.g., message body), which includes four first elements (e.g., four paragraphs), where a third one of the first elements (e.g., third paragraph) includes four second elements (e.g., four bulleted items).

As detailed above, the reply may be anchored to a reply location, which may be associated with the structure of the message. That is, the reply may be associated with an identifier referencing a message part, and one or more identifiers referencing one or more elements of the message. With reference to the example above, the reply may be associated with a first identifier referencing the message body part, a second identifier referencing the third paragraph, and a third identifier referencing the third bullet item.

In some aspects, the reply may be presented "inline" within the message structure. That is, the reply may be inserted as part of the message rather than as a separate message (e.g., such as a reply message in a conversation thread). In this case, to determine a presentation structure, the reply may be inserted as an additional element within the message structure. For example, for a reply anchored to the third one of the second elements, the reply may be inserted as a third element under the third one of the second elements. In aspects, when presenting or displaying the reply, content of the reply may be displayed within the content of the message, e.g., indented below the third bulleted item of the third paragraph of the message body. In other aspects, the content of the reply may be displayed within the content of the message without indentation in a different font color below the third bulleted item of the third paragraph. In still further aspects, the content of the reply may be displayed within the content of the message in a text box or a comment bubble to the side or below the third bulleted item of the third paragraph. A number of different presentation options exist and may be employed without departing from the present disclosure.

Presenting a reply "inline" with the message allows users to efficiently collaborate regarding specific aspects of a message. For instance, where the message includes a plurality of elements, e.g., four topics for review, or three action items that need to be completed, or twelve items that need to be brought for a surprise party, recipients of the message are able to insert replies within the message body to specifically address individual elements. Traditionally, a user would "reply to all" or "forward" a message in order to interact with other users, however, this method creates numerous copies of the original message, often requires a user to input clarifying information (e.g., "With respect to #1 . . . "), clutters recipient inboxes, and necessitates compiling or synchronizing answers and/or comments across the various replies.

To overcome the above issues, the present methods allow a user to insert a reply within a single version or representation of a message. Thus, rather than creating multiple copies of the message by "replying to all" or "forwarding" the message, multiple users are able to collaborate regarding the single version of the message. For endpoints registered with the unified messaging application, for instance, the single version of the message may be presented within a conversation in a central pane of the user interface and participants to the conversation may insert replies, comments, updates, etc., to specific elements within the single version of the message. In some aspects, based on a time of the last reply or comment, the single version of the message may be presented within the conversation in ascending chronological order (e.g., most recent message presented at the bottom of the conversation) or descending chronological order (e.g., most recent message presented at the top of the conversation) in the central pane. Thus, as users are responding to and commenting on specific elements within a message, participating users are able to easily and efficiently stay abreast of updates and changes in real-time because inline replies occur in one location.

At identify endpoint operation 812, an endpoint may be identified for one or more users to whom the reply to the message may be transmitted or displayed. In some cases, one or more endpoints may be identified for each user, e.g., a personal computer, a mobile device, a tablet, a smart television, etc. Identifying an endpoint may include identifying a device type for the endpoint (e.g., mobile device, personal computer, tablet computer, etc.), a display type for the endpoint (e.g., monitor, television, touch enabled display, graphical display, alphanumeric display, etc.), network access available to the endpoint (e.g., access to a wide area network (WAN), a local area network (LAN), a virtual private network (VPN), and the like, via cellular, wired, wireless, Wi-Fi, or other technology), a state of the endpoint (e.g., powered on, active, inactive, locked, sleeping, powered off, etc.), applications registered to the endpoint (e.g., enterprise or third party email messaging applications, SMS messaging applications, social networking applications, instant messaging applications, voicemail applications, calendaring applications, etc.), and the like. As should be appreciated, one or more combinations of device type, display type, network access, registered applications, and state may be identified for an endpoint at any one time. In aspects, identify endpoint operation 810 is similar to identify endpoint operation 410, as described above.

At decision operation 814, it is determined whether an endpoint is registered with a unified messaging application. In aspects, whereas the reply to the message may have been received at an endpoint registered with the unified messaging application, the reply to the message may be displayed or provided to users on endpoints that are not registered with the unified messaging application. If an endpoint is registered with the unified messaging application, the method proceeds to send operation 818. Alternatively, if an endpoint is not registered with the unified messaging application, the method proceeds to transform operation 816.

At transform operation 816, the presentation structure is transformed such that it is readable and/or renderable by one or more applications registered with the one or more identified endpoints. That is, while an inline reply may be fully readable and/or presentable to a user accessing the unified messaging platform, the inline reply may need to be transformed in order to be readable and/or presentable to an external user. For instance, if the message with the inline reply is sent to an external email address (e.g., third party email messing application), the presentation structure may be transformed into: "Person A commented on <anchored content>: <inline comment body."

As used herein, a presentation structure may include the content of the message and the content of the reply in a structured format. In some aspects, for applications other than the unified messaging application, the presentation structure for an inline reply may be altered (i.e., transformed) such that it can be provided to a team member who is not registered with the unified messaging application. That is, transforming the presentation structure may include translating the presentation structure into a representation readable by a receiving application and may also include reformatting the presentation structure such that it is renderable by a receiving application registered with the identified endpoint. Thus, transforming the presentation structure may be described in terms of a translation process (e.g., such that the presentation structure is in a language or format readable or understandable by a consuming application) and a reformatting process (e.g., providing the presentation structure in a form such that it may be rendered or presented by a consuming application or by a particular endpoint). In some aspects, the transform operation may involve a single process that transforms the presentation structure into a language or format readable by a receiving application, where the receiving application performs any processing necessary for rendering or presenting the message with the inline reply on a particular endpoint.

In some aspects, the presentation structure may be transformed differently for different applications registered with different endpoints. For instance, the presentation structure may be transformed based on one or more factors associated with an identified endpoint, including a device type, display type, registered applications, etc. For instance, if the receiving application is a third party email messaging application, the presentation structure may be reformatted, if necessary, to correspond to an "email-like" structure having a recipient field part, a subject line part, and message body part, as described above. The message body may further comprise a hierarchical structure including one or more first elements, the one or more first elements including one or more second elements, as described above.

In aspects, the presentation structure includes the content of the reply anchored to the reply location within the message such that the reply is included within the hierarchical structure of the message. The presentation structure may further be translated into a first representation readable by an enterprise messaging application and into a second representation readable by a third party email messaging application. In some cases, a third party email messaging application may be unable to process a hierarchical structure for a message. In this case, the presentation structure may be flattened such that content for the message and the reply are provided in a linear structure. In order to emphasize the reply within the message, the reply may be presented in a different colored font, bold font, underlining, or otherwise. Moreover, in some instances, the presentation structure may not be transmitted to certain types of receiving applications, e.g., an SMS application, an instant messaging application, a social networking application, and the like.

Furthermore, as introduced above, transform operation may be based on additional factors, such as a device type and display type. For instance, while transform operation may include reformatting a presentation structure such that it is renderable by a receiving application, transform operation may also include reformatting the presentation structure such that it is renderable by a particular device type having a particular display type. For instance, while a personal computer may be capable of rendering a message having an inline reply, a mobile device may not have such capability. In this case, transform operation may reformat the presentation structure (e.g., the message with the inline reply) as a digital image (e.g., .jpeg) or in a portable document format (PDF) for rendering by the mobile device.

At send operation 818, the presentation structure for a message with an inline reply is sent to one or more endpoints. In some aspects, e.g., when the one or more endpoints identified for the user are registered with the unified messaging application, presenting the message with the inline reply may not require transformation. That is, as described above, when the reply is sent (e.g., upon a user inputting the reply at a location within the message), a single version of the message with the inline reply may be presented within a conversation in a central pane of a user interface of the unified messaging platform. More specifically, based on the example detailed above, the reply may be presented as indented below the third bulleted item of the third paragraph of the message body, or presented without indentation in a different font color below the third bulleted item of the third paragraph, or presented in a text box or a comment bubble to the side or below the third bulleted item of the third paragraph.

Alternatively, when an endpoint is not registered with the unified messaging application, the transformed presentation structure for the message with the inline reply may be sent to a receiving application. The receiving application may then render or present a copy of the message with the inline reply to a user at the identified endpoint. In this case, when an endpoint is not registered with the unified messaging application, while the user may benefit from receiving a copy of the message with the inline reply, the user may not benefit from viewing a single synchronized version of the message in real-time as inline replies and comments are inserted.

As should be appreciated, operations 802-818 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 9:
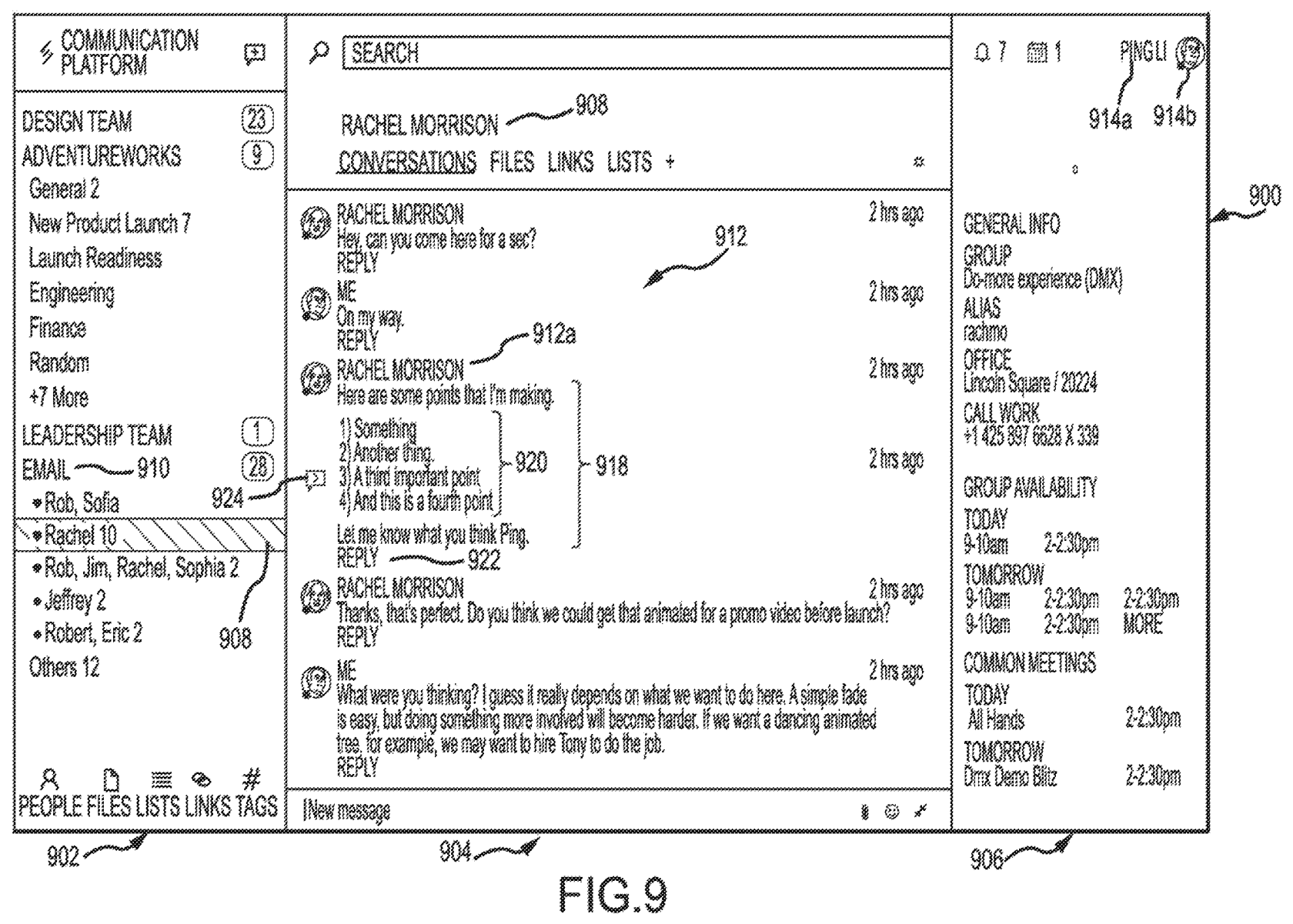

FIG. 9 illustrates an exemplary interface for initiating an inline reply in a message, according to an example embodiment.

As described above, the unified messaging platform may provide a user interface 900 including three panes, e.g., a left rail 902, a center pane 904, and a right rail 906. In aspects, as described above, upon selecting a conversation (e.g., conversation 908) within an email portal (e.g., email portal 910) in the left rail 902, the conversation 908 with one or more communications 912 may be displayed in center pane 904. As illustrated by FIG. 9, conversation 908 has been selected and the communications 912 between a first user and a second user (e.g., Rachel) are displayed in center pane 904. In this example, the first user refers to the particular user accessing the unified messaging application (e.g., Ping Li) identified by user name 914a and user icon 914b.

In aspects, a communication 912a from Rachel was received. The communication 912a is a message including content 918, which includes a list of items 920, e.g., "1) Something, 2) Another thing, 3) A third important point, 4) And this is the fourth point." As illustrated, a reply link 922 is displayed under communication 912a, whereas an inline reply link 924 is displayed to the left of the list of items 920. In some cases, the inline reply link 924 is not displayed unless and until a user hovers over the list of items 920 or places a cursor within the list of items 920.

As should be appreciated, the various features and functionalities of user interface 900 described with respect to FIG. 9 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 10:
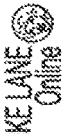
FIG. 10 illustrates an exemplary interface for presenting an inline reply in a message, according to an example embodiment.

FIG. 10 illustrates an exemplary interface for presenting an inline reply in a message, according to an example embodiment.

As described above, the unified messaging platform may provide a user interface 1000 including three panes, e.g., a left rail 1002, a center pane 1004, and a right rail 1006. In aspects, as described above, upon selecting a category (e.g., category 1008) in the left rail 1002, a conversation may be displayed upon selecting conversation tab 1010. The conversation may include one or more communications 1012 displayed in center pane 1004.

As illustrated by FIG. 10, communication 1012a includes a salutation 1014 (e.g., introduction) and a list of items 1016. A structure for communication 1012a may be described as a paragraph structure, a list structure, or a combination thereof. For a paragraph structure, communication 1012a may be described as including four paragraphs (e.g., four elements), a first paragraph including salutation 1014, a second paragraph including the first list item 1016a of the list of items 1016, a third paragraph including the second list item 1016b of the list of items 1016, and a four paragraph including the third list item 1016c of the list of items 1016. Alternatively, for a combination of a list structure and a paragraph structure, communication 1012a may be described as including two paragraphs (e.g., first elements), the first paragraph including salutation 1014, and the second paragraph including three list items (e.g., second elements). That is, the second paragraph may be described as including the first list item 1016a, the second list item 1016b, and the third list item 1016c of the list of items 1016. As should be appreciated, the above description of the structure of communication 1012a is provided for exemplary purposes and is not intended to limit the scope of the disclosure herein, that is, other approaches for describing message structures exist and any suitable description may be employed without departing from the present disclosure.

As described above, inline replies may be inserted into a communication by selecting an inline reply link (e.g., inline reply link 924, as described in FIG. 9). As further illustrated by FIG. 10, inline replies 1018a-1018d are displayed below one or more of the list items 1016a-1016c. That is, inline reply 1018a is a comment or update regarding list item 1016a and is displayed below list item 1016a in a colored font (e.g., green). Moreover, a user identifier 1020 referencing the user (e.g., "Gerald") who sent the inline reply 1018a is displayed to the left of the inline reply. Inline replies 1018b-1018d are comments or updates regarding list item 1016b. For instance, inline reply 1018b and inline reply 1018d sent from Rachel are displayed below list item 1016b in a colored font (e.g., blue), and inline reply 1018c sent from Mike is displayed below list item 1016b in a colored font (e.g., red). List item 1016c has not received a reply.

As illustrated, inline replies 1018a-1018d are displayed below respective list items 1016a and 1016b in different font colors. However, other display methods are available and may be employed without departing from the present disclosure. For instance, inline replies may be displayed as indented below respective elements of a message, or inline replies may be displayed as comment bubbles below or to the side of respective elements of a message.

As should be appreciated, the various features and functionalities of user interface 1000 described with respect to FIG. 10 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 11:
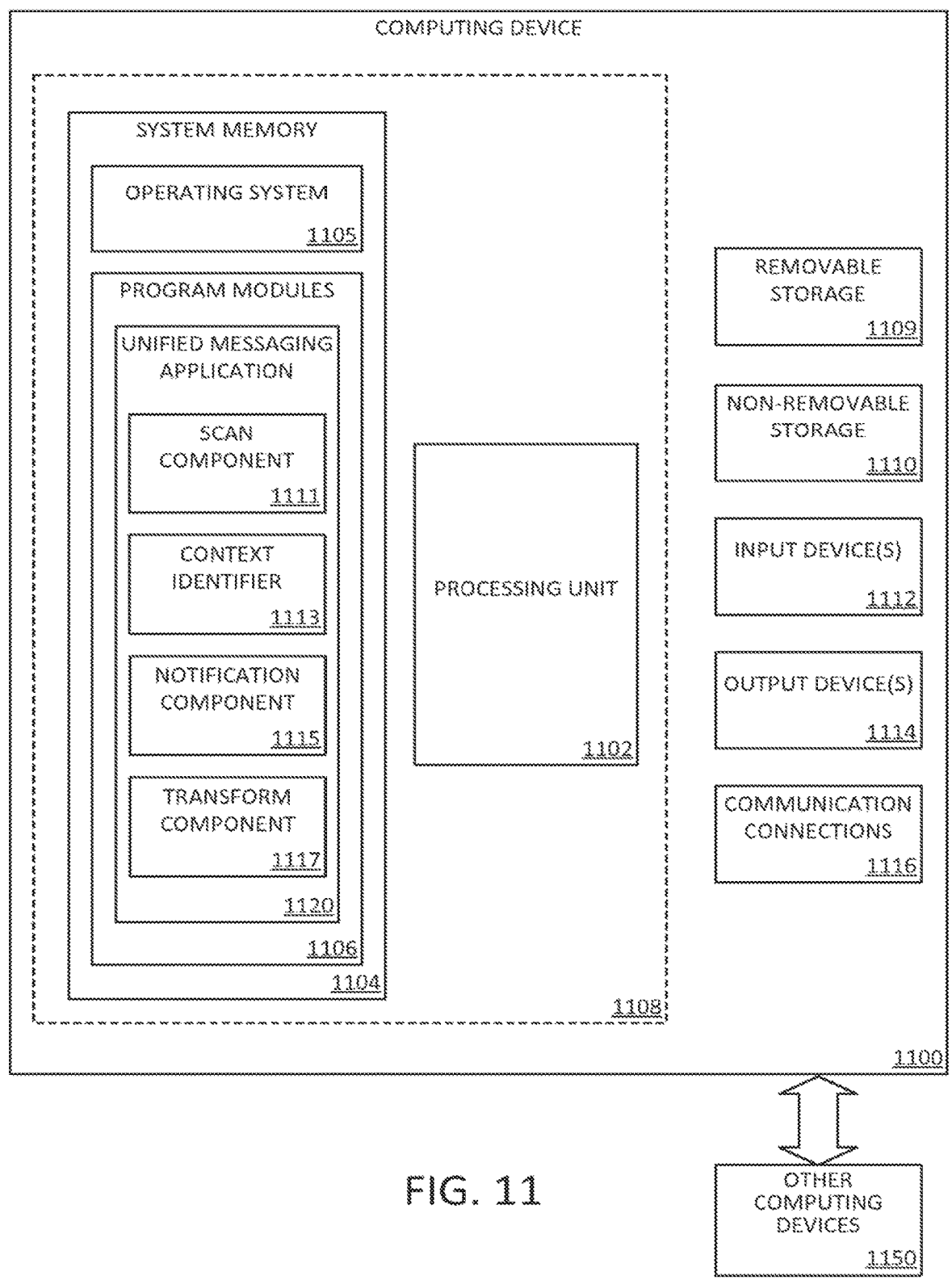
FIG. 11 is a block diagram illustrating example physical components of a computing device with which aspects of the disclosure may be practiced.

FIGS. 11-14 and the associated descriptions provide a discussion of a variety of operating environments in which aspects of the disclosure may be practiced. However, the devices and systems illustrated and discussed with respect to FIGS. 11-14 are for purposes of example and illustration and are not limiting of a vast number of computing device configurations that may be utilized for practicing aspects of the disclosure, described herein FIG. 11 is a block diagram illustrating physical components (e.g., hardware) of a computing device 1100 with which aspects of the disclosure may be practiced. The computing device components described below may have computer executable instructions for implementing a unified messaging application on a server computing device 106 (or server computing device 308), including computer executable instructions for unified messaging application 1120 that can be executed to employ the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running unified messaging application 1120, such as one or more components in regards to FIG. 3 and, in particular, scan component 1111, context identifier 1113, notification component 1115, or transform component 1117. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., unified messaging application 1120) may perform processes including, but not limited to, the aspects, as described herein. Other program modules that may be used in accordance with aspects of the present disclosure, and in particular for providing a unified messaging platform, may include scan component 1111, context identifier 1113, notification component 1115, or transform component 1117, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
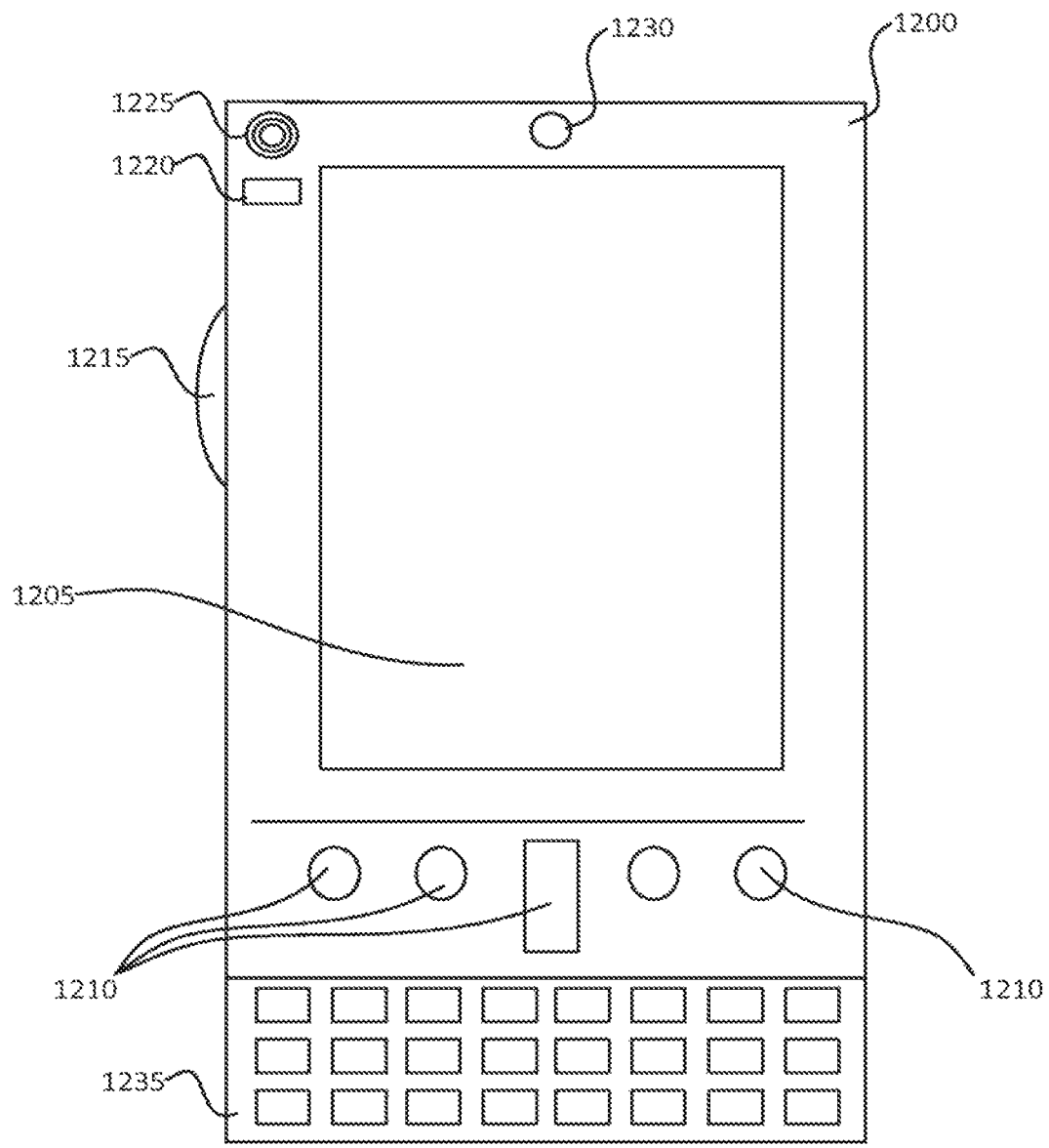
FIGS. 12A and 12B are simplified block diagrams of a mobile computing device with which aspects of the present disclosure may be practiced.
Figure 12B:
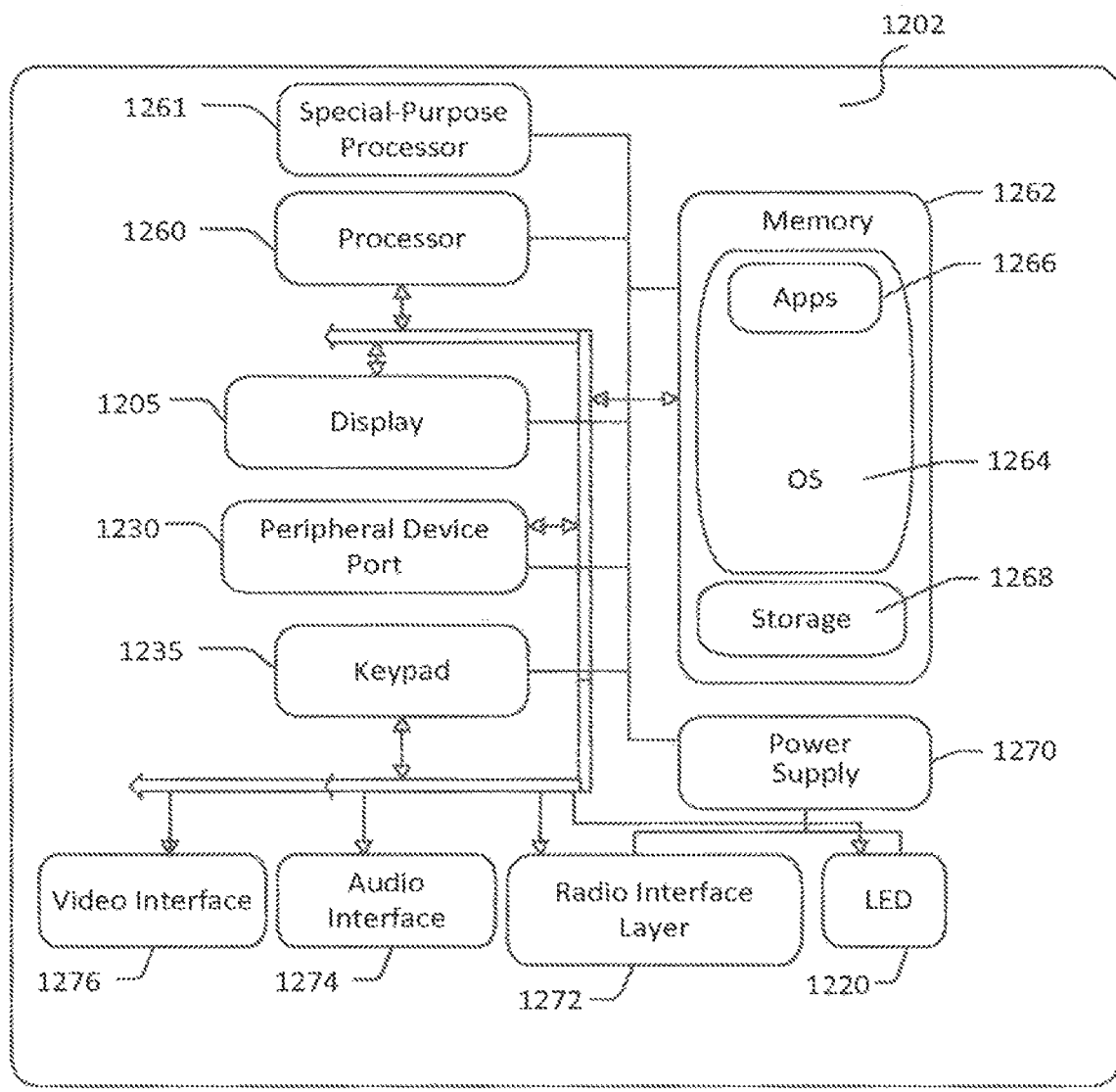

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for providing a unified messaging platform as described herein (e.g., search engine, extractor module, relevancy ranking module, answer scoring module, etc.).

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

Figure 13:
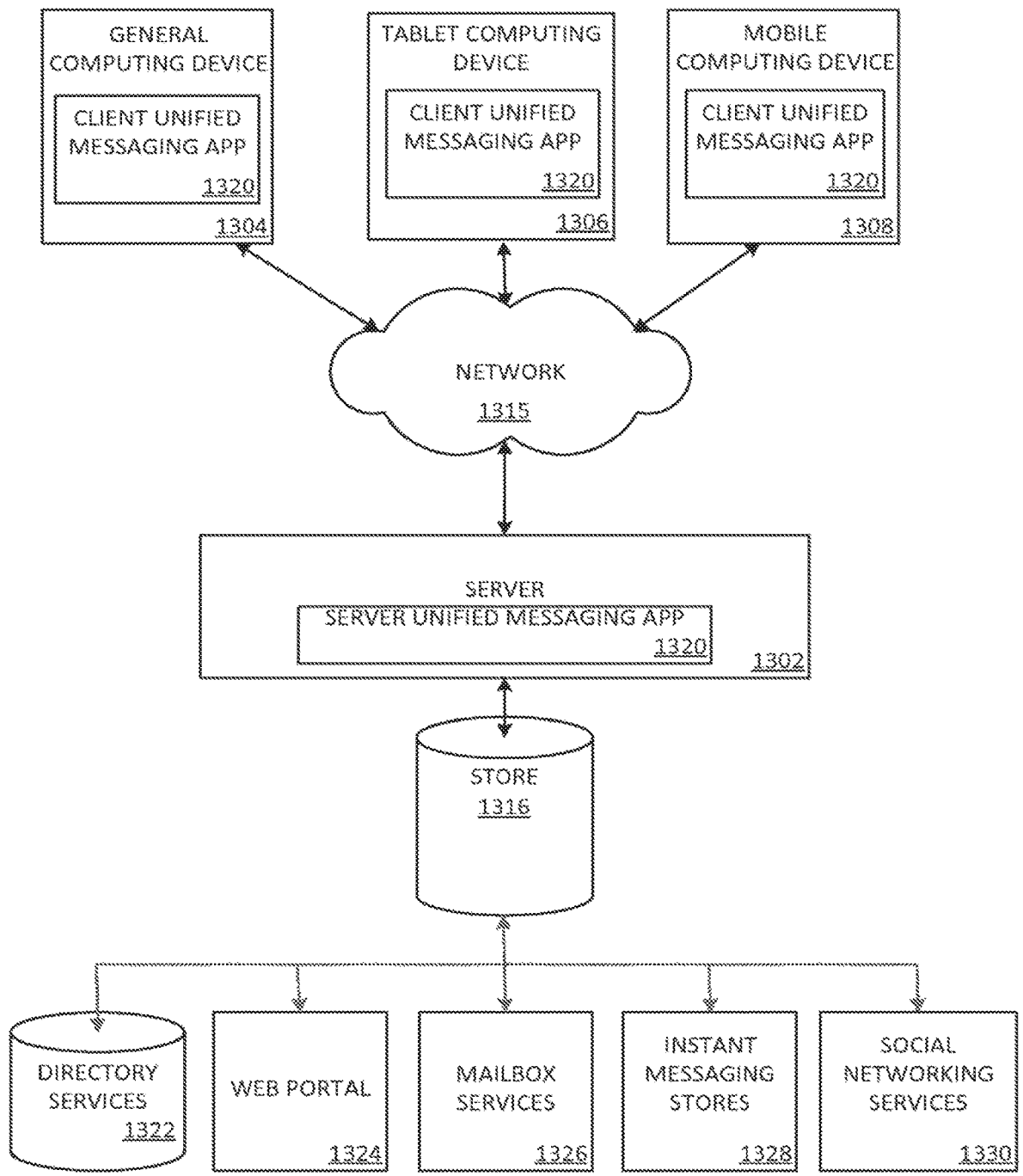
FIG. 13 is a simplified block diagram of a distributed computing system in which aspects of the present disclosure may be practiced.

FIG. 13 illustrates one aspect of the architecture of a system for processing data received at a computing system from a remote source, such as a personal computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The unified messaging application 1320 may be employed by a client that communicates with server device 1302, and/or the unified messaging application 1320 may be employed by server device 1302. The server device 1302 may provide data to and from a client computing device such as a personal computer 1304, a tablet computing device 1306 and/or a mobile computing device 1308 (e.g., a smart phone) through a network 1315. By way of example, the computer system described above with respect to FIGS. 1-12 may be embodied in a personal computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Figure 14:
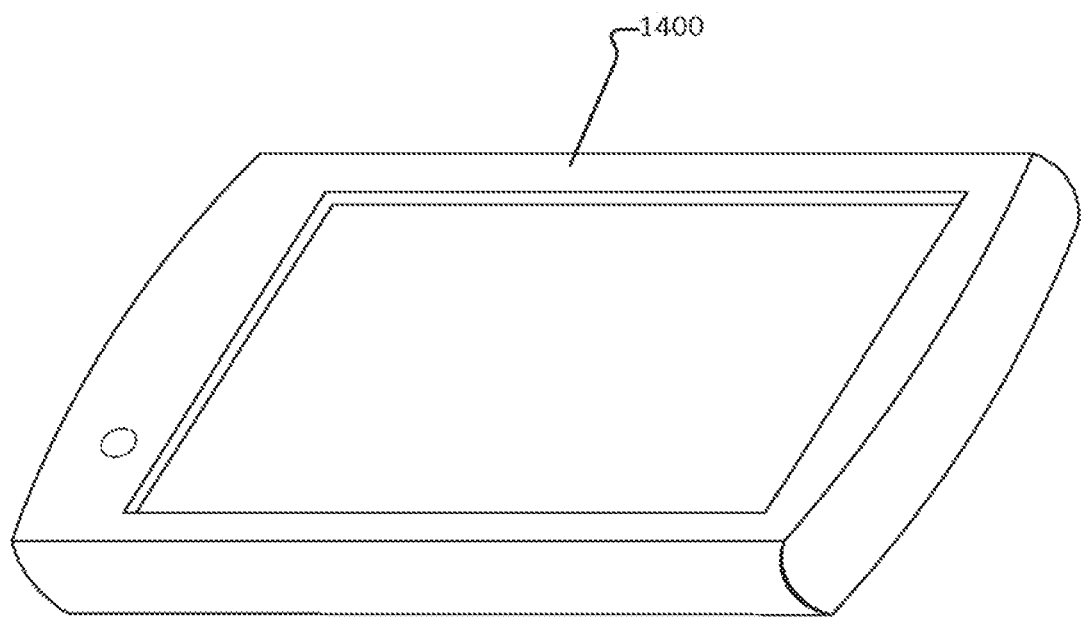
FIG. 14 illustrates a tablet computing device for executing one or more aspects of the present disclosure.

FIG. 14 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A system comprising:
a hardware processing circuitry; and
at least one memory storing computer executable instructions that, when executed, configure the hardware processing circuitry to perform operations comprising:
scanning a message to identify a structure of first text content included in the message, the structure identifying at least one element of the first text content, the one element having a location within the first text content;

receiving an indication selecting the one element;
displaying a new text input field within the first text content at the location of the selected one element;
receiving reply text content into the new input field; and
sending a reply to the message, wherein the reply comprises the reply text content integrated into the message at the location.

2. The system of claim 1, the operations further comprising:
identifying a recipient of the reply; and
transmitting the structure to the recipient.

3. The system of claim 2, the operations further comprising:
identifying an endpoint device associated with the recipient;
determining whether the endpoint device is registered with a unified messaging application; and
transforming a format of the structure to a second format in response to determining the endpoint device is not registered with the unified messaging application, wherein the structure is transmitted to the recipient in the second format.

4. The system of claim 2, the operations further comprising:
identifying an endpoint device associated with the recipient;
determining whether the endpoint device is registered with a third party email messaging application; and
transforming a format of the structure to a second format in response to determining that the endpoint device is registered with the third party email messaging application, wherein the structure is transmitted to the recipient in the second format.

5. The system of claim 4, wherein the transforming comprises translating a notification included in the structure renderable by a receiving application.

6. The system of claim 5, wherein the transforming comprises translating the notification.

7. The system of claim 4, the operations further comprising:
determining a plurality of applications including a registration of the endpoint device;
determining a priority of the applications, wherein the transforming transforms the structure into the second format so as to be compatible with a highest priority application of the plurality of applications.

8. The system of claim 7, the operations further comprising:
updating the priorities of the applications that include a registration of the endpoint device, and
second transforming a different structure into another format so as to be compatible with a new highest priority application of the plurality of applications.

9. The system of claim 8, wherein the priorities are updated based on a relative frequency of use of each of the applications.

10. A method comprising:
scanning a message to identify a structure of first text content included in the message, the structure identifying at least one element of the first text content, the one element having a location within the first text content;
receiving an indication selecting the one element;
displaying a new text input field within the first text content at the location of the selected one element;
receiving reply text content into the new input field; and
sending a reply to the message, wherein the reply comprises the reply text content integrated into the message at the location.

11. The method of claim 10, further comprising:
identifying a recipient of the reply; and
transmitting the structure to the recipient.

12. The method of claim 11, further comprising:
identifying an endpoint device associated with the recipient;
determining whether the endpoint device is registered with a unified messaging application; and
transforming a format of the structure to a second format in response to determining the endpoint device is not registered with the unified messaging application, wherein the structure is transmitted to the recipient in the second format.

13. The method of claim 11, further comprising:
identifying an endpoint device associated with the recipient;
determining whether the endpoint device is registered with a third party email messaging application; and
transforming a format of the structure to a second format in response to determining that the endpoint device is registered with the third party email messaging application, wherein the structure is transmitted to the recipient in the second format.

14. The method of claim 13, wherein the transforming comprises translating a notification included in the structure renderable by a receiving application.

15. The method of claim 14, wherein the transforming comprises translating the notification.

16. The method of claim 15, further comprising:
determining a plurality of applications including a registration of the endpoint device;
determining a priority of the applications, wherein the transforming transforms the structure into the second format so as to be compatible with a highest priority application of the plurality of applications.

17. The method of claim 16, further comprising:
updating the priorities of the applications that include a registration of the endpoint device, and
second transforming a different structure into another format so as to be compatible with a new highest priority application of the plurality of applications.

18. The method of claim 17, wherein the priorities are updated based on a relative frequency of use of each of the applications.

19. A non-transitory computer readable storage medium comprising instructions that when executed configure hardware processing circuitry to perform operations comprising:
scanning a message to identify a structure of first text content included in the message, the structure identifying at least one element of the first text content, the one element having a location within the first text content;
receiving an indication selecting the one element;
displaying a new text input field within the first text content at the location of the selected one element;
receiving reply text content into the new input field; and
sending a reply to the message, wherein the reply comprises the reply text content integrated into the message at the location.

20. The non-transitory computer readable storage medium of claim 19, further comprising:
identifying a recipient of the reply;
transmitting the structure to the recipient;

identifying an endpoint device associated with the recipient;

determining whether the endpoint device is registered with a unified messaging application; and transforming a format of the structure to a second format in response to determining the endpoint device is not registered with the unified messaging application, wherein the structure is transmitted to the recipient in the second format.

* * * * *